US011100607B2

(12) United States Patent
Cho et al.

(10) Patent No.: US 11,100,607 B2
(45) Date of Patent: Aug. 24, 2021

(54) ELECTRONIC APPARATUS AND CONTROL METHOD FOR UPDATING PARAMETERS OF NEURAL NETWORKS WHILE GENERATING HIGH-RESOLUTION IMAGES

(71) Applicant: SAMSUNG ELECTRONICS CO., LTD., Suwon-si (KR)

(72) Inventors: Insang Cho, Suwon-si (KR); Kiwon Yoo, Suwon-si (KR); Wonjae Lee, Hwaseong-si (KR); Daesung Cho, Suwon-si (KR); Chanyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/720,433

(22) Filed: Dec. 19, 2019

(65) Prior Publication Data
US 2021/0049740 A1    Feb. 18, 2021

(30) Foreign Application Priority Data
Aug. 14, 2019 (KR) .................. 10-2019-0099609

(51) Int. Cl.
*G06T 3/40* (2006.01)
*G06F 3/14* (2006.01)
(Continued)

(52) U.S. Cl.
CPC ............. *G06T 3/4046* (2013.01); *G06F 3/14* (2013.01); *G06N 3/04* (2013.01); *G06N 3/08* (2013.01); *G06T 3/4007* (2013.01); *G06T 3/4053* (2013.01)

(58) Field of Classification Search
None
See application file for complete search history.

(56) References Cited

U.S. PATENT DOCUMENTS 9,153,231 B1    10/2015   Salvador et al.
9,819,965 B2    11/2017   Puri et al.
(Continued)

FOREIGN PATENT DOCUMENTS

CN        108596841         9/2018
KR    10-2018-0114488      10/2018

OTHER PUBLICATIONS

Kim et al.; "Accurate Image Super-Resolution Using Very Deep Convolutional Networks;" 2016 IEEE Conference on Computer Vision and Pattern Recognition; pp. 1646-1654 (Year: 2016).*

(Continued)

*Primary Examiner* — Edward Martello
(74) *Attorney, Agent, or Firm* — Nixon & Vanderhye P.C.

(57) ABSTRACT

Disclosed is an electronic apparatus. The electronic apparatus includes: a memory configured to store information regarding an artificial intelligence model including a plurality of layers; and a processor configured to perform interpolation processing on an input image and to process the interpolated image using the artificial intelligence model to obtain an output image, wherein the processor is configured to be operated in a first mode or a second mode based on an update of parameters used in at least one of the plurality of layers being required, the first mode including a mode in which the output image is obtained based on an image processed using the artificial intelligence model in which the parameters are updated and based on the interpolated image, and the second mode includes a mode in which the output image is obtained based on the interpolated image.

20 Claims, 17 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 10,489,887 | B2 | 11/2019 | El-Khamy et al. |
| 2018/0075581 | A1 | 3/2018 | Shi et al. |
| 2018/0181857 | A1* | 6/2018 | Mathew ............... G06N 3/0454 |
| 2018/0181863 | A1 | 6/2018 | Sato et al. |
| 2018/0197084 | A1 | 7/2018 | Kim et al. |
| 2018/0293707 | A1 | 10/2018 | El-Khamy et al. |
| 2018/0293713 | A1 | 10/2018 | Vogels et al. |
| 2019/0065946 | A1* | 2/2019 | Sato ....................... G06N 3/063 |
| 2019/0095794 | A1 | 3/2019 | Aldana López et al. |
| 2019/0138889 | A1 | 5/2019 | Jiang et al. |
| 2020/0082249 | A1* | 3/2020 | Hua ..................... G06T 11/001 |
| 2020/0090305 | A1 | 3/2020 | El-Khamy et al. |
| 2020/0167889 | A1* | 5/2020 | Park ..................... G06K 9/4628 |
| 2020/0234402 | A1* | 7/2020 | Schwartz ................. G06N 3/08 |

OTHER PUBLICATIONS

Chen et al.; "Image Super-Resolution Algorithm Based on Dual-Channel Convolutional Neural Networks;" Applied Sciences Article; 16 pages; MDPI, Basel, Switzerland (Year: 2019).*

Search Report and Written Opinion dated May 13, 2020 in counterpart International Patent Application No. PCT/KR2020/001262.
Search Report and Written Opinion dated Jun. 18, 2020 in counterpart European Patent Application No. 20151293.6.
Kim et al., "3DSRnet: Video Super-Resolution Using 3d Convolutional Neural Networks," arXiv: 1812.09079v2, Jun. 20, 2019, pp. 1-9 (retreived from the Internet May 5, 2020).
Chen et al., "Image Super-Resolution Algorithm Based on Dual-Channel Convolutional Neural Networks," Applied Sciences, vol. 9, No. 11, Jun. 5, 2019, pp. 4-13 (retrieved from the Internet May 8, 2020).
Dong et al, "Accelerating the Super-Resolution Convolutional Neural Network," arXiv: 1608.00367v1, Aug. 1, 2016 (retrieved from the Internet May 8, 2020).
Neubig et al, "DyNet: The Dynamic Neural Network Toolkit," arxiv.Org, Cornell University Library, 201 Olin Library Cornell University, Ithaca, NY, Jan. 16, 2017, pp. 1-33.
Lin et al., "An HVS-Directed Neural-Network-Based Image Resolution Enhancement Scheme for Image Resizing," IEE Transactions on Fuzzy Systems, IEEE Service Center, Piscataway, NJ, Aug. 1, 2007, vol. 15, No. 4, pp. 605-615.
India Examination Report dated Jun. 29, 2021 for IN Application No. 202014002085.
Japanese Office Action dated Jul. 6, 2021 for JP Application No. 2020-66303.

* cited by examiner

ELECTRONIC APPARATUS AND CONTROL METHOD FOR UPDATING PARAMETERS OF NEURAL NETWORKS WHILE GENERATING HIGH-RESOLUTION IMAGES

CROSS-REFERENCE TO RELATED APPLICATION

This application is based on and claims priority under 35 U.S.C. § 119 to Korean Patent Application No. 10-2019-0099609, filed on Aug. 14, 2019, in the Korean Intellectual Property Office, the disclosure of which is incorporated by reference herein in its entirety.

BACKGROUND

Field

The disclosure relates to an electronic apparatus and a control method thereof. For example, to an electronic apparatus performing image processing using an artificial intelligence model, and a control method thereof.

Description of Related Art

In accordance with development of electronic technologies, various types of electronic devices have been developed and spread. Particularly, display apparatuses used in various places such as homes, offices, public places, and the like, have been continuously developed over the recent years.

Recently, a demand for a high-resolution image service has been largely increased. In response to such a demand, a deep-learning based technology such as super resolution and style transfer has been used for image processing.

The super resolution may refer, for example, to a technology that performs a series of media processing on an input low-resolution image to reconstruct (or construct) a high-resolution image. For example, a high-resolution image may be reconstructed by scaling an input lower-resolution image in horizontal and vertical directions using a deep-learning based convolutional neural network (CNN) model including a plurality of layers.

However, each of the plurality of layers included in the CNN model has a large number of parameters (or weighted values), and thus it is difficult to update the parameters without stopping calculation and artifacts may appear in an output image during the update.

SUMMARY

Embodiments of the disclosure address the above disadvantages and other disadvantages not described above.

According to an example embodiment of the disclosure, an electronic apparatus includes: a memory configured to store information regarding an artificial intelligence model including a plurality of layers; and a processor configured to perform interpolation processing on an input image and process the interpolated image using the artificial intelligence model to obtain an output image, wherein the processor is configured to be operated in a first mode or a second mode where an update of parameters used in at least one of the plurality of layers is required, the first mode including a mode in which the output image is obtained based on an image processed using the artificial intelligence model in which the parameters are updated and the interpolated image, and the second mode including a mode in which the output image is obtained based on the interpolated image.

According to another example embodiment of the disclosure, a method of controlling an electronic apparatus including a memory in which information regarding an artificial intelligence model including a plurality of layers is stored includes: performing interpolation processing on an input image; and obtaining an output image based on a first mode or a second mode where an update of parameters used in at least one of the plurality of layers is required, wherein the first mode includes a mode in which the output image is obtained based on an image obtained by processing the interpolated image using the artificial intelligence model in which the parameters are updated and the interpolated image, and the second mode includes a mode in which the output image is obtained based on the interpolated image.

According to another example embodiment of the disclosure, a non-transitory computer-readable medium storing a computer instruction which, when executed by a processor of an electronic apparatus in which information regarding an artificial intelligence model including a plurality of layers are stored, cause the electronic apparatus to perform an operation, the operation including: performing interpolation processing on an input image; and obtaining an output image based on a first mode or a second mode where an update of parameters used in at least one of the plurality of layers is required, wherein the first mode includes a mode in which the output image is obtained based on an image obtained by processing the interpolated image using the artificial intelligence model in which the parameters are updated and the interpolated image, and the second mode includes a mode in which the output image is obtained based on the interpolated image.

Additional and/or other aspects and advantages of the disclosure will be set forth in part in the description which follows and, in part, will be apparent from the description, or may be learned by practice of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
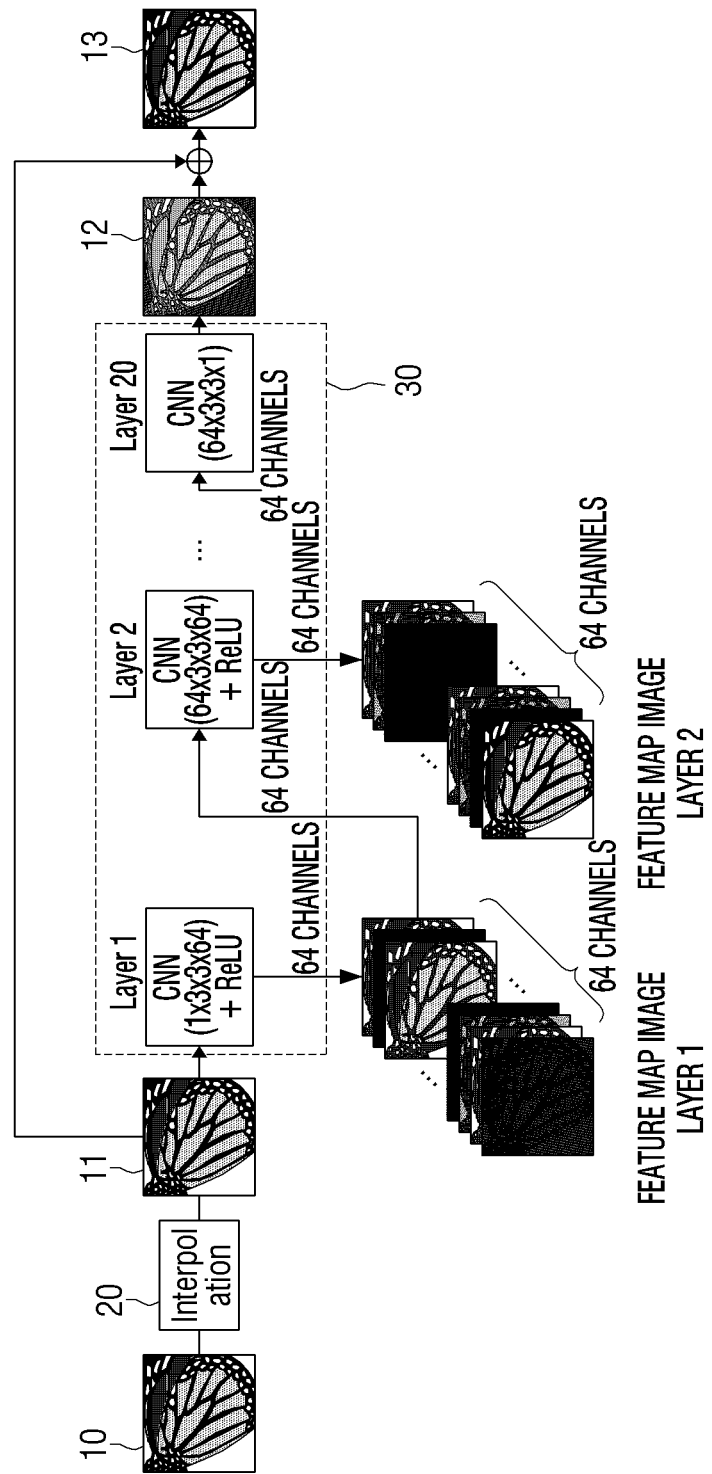
FIG. 1A is a diagram illustrating an example image processing operation of an electronic apparatus according to an embodiment of the disclosure.

The disclosure provides an electronic apparatus capable of efficiently updating parameters without stopping calculation in a real-time neural network system, and a control method thereof.

Hereinafter, the disclosure will be described in greater detail with reference to the accompanying drawings.

Terms used in the disclosure are briefly described, and the disclosure will be described in greater detail.

General terms that are currently widely used are selected as terms used in embodiments of the disclosure in consideration of functions in the disclosure, but may be changed depending on the intention of those skilled in the art or a judicial precedent, the emergence of a new technique, and the like. In addition, in a specific case, terms may be arbitrarily chosen. The meaning of such terms may be mentioned in detail in a corresponding description portion of the disclosure. Therefore, the terms used in embodiments of the disclosure should be defined based on the meaning of the terms and the contents throughout the disclosure rather than simple names of the terms.

Terms "first", "second", and the like, may be used to describe various components, but the components are not to be understood as being limited by these terms. The terms are used simply to distinguish one component from another component.

Singular forms are intended to include plural forms unless the context clearly indicates otherwise. It will be further understood that terms "include" or "formed of" used in the disclosure may specify the presence of features, numerals, steps, operations, components, parts, or combinations thereof mentioned in the disclosure, but do not preclude the presence or addition of one or more other features, numerals, steps, operations, components, parts, or combinations thereof.

An expression "at least one of A or B" should be understood as indicating any one of "A", "B", or "A and B".

In the disclosure, a "module'" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor (not illustrated) except for a "module" or a "-er/or" that needs to be implemented by specific hardware.

Hereinafter, various example embodiments of the disclosure will be described in greater detail with reference to the accompanying drawings. However, the disclosure may be modified in various different forms, and is not limited to embodiments described herein. In addition, in the drawings, portions unrelated to the description may be omitted, and similar reference numerals may be used to describe similar elements throughout the disclosure.

FIG. 1A is a diagram illustrating an example image processing operation of an electronic apparatus according to an embodiment of the disclosure.

The electronic apparatus according to an example embodiment of the disclosure may perform image processing on an input image using an artificial intelligence model (or network model or learning network model). The artificial intelligence model may include a plurality of neural network layers. Each of the plurality of neural network layers may have a plurality of parameters (or a plurality of weight values), and neural network calculation (or operation) may be performed using a calculation result of a previous layer and through calculation using the plurality of parameters. The parameters of the plurality of neural network layers may be optimized by a learning result of the artificial intelligence model. For example, the plurality of parameters may be updated to decrease or minimize a loss value or cost value acquired by the artificial intelligence model during a learning process. An artificial neural network may include, for example, and without limitation, a deep neural network (DNN). For example, the artificial neural network may include, for example, and without limitation, a convolutional neural network (CNN), a recurrent neural network (RNN), a restricted Boltzmann machine (RBM), a deep belief network (DBN), a bidirectional recurrent deep neural network (BRDNN), a deep Q-network, or the like, but is not limited thereto.

FIG. 1A illustrates an example of an artificial intelligence model for super resolution processing according to an embodiment of the disclosure. The super resolution may refer, for example, to a technology that performs a series of media processing on a low-resolution image to convert the image into a high-resolution image.

Referring to FIG. 1A, the electronic apparatus according to the embodiment of the disclosure may perform interpolation processing 20 on an input image 10, for example, a low-resolution image, and input an interpolated image 11 to an artificial intelligence model 30 to obtain a residual image 12. For example, the artificial intelligence model 30 may be implemented by a residual neural network.

The electronic apparatus may combine the interpolated image 11 with the residual image 12 to obtain an output image 13, for example, a high-resolution image. The interpolation processing may refer, for example, to upscaling of the image from low resolution to high resolution, and at least one of interpolation techniques such as, for example, and without limitation, bilinear interpolation, nearest neighbor interpolation, bicubic interpolation, deconvolution interpolation, subpixel convolution interpolation, polyphase interpolation, trilinear interpolation, linear interpolation, or the like, may be used. Further, the residual image may refer, for example, to an image including only residual information. The residual information, which may be information based on a difference between an input image and a reference image, may include at least one of, for example, and without limitation, an edge direction, an edge strength, noise information, texture information, or the like, but is not limited thereto. According to another example, the residual information may include, for example, and without limitation, at least one of gradation information, brightness information, gamma information, or the like.

Figure 1B:
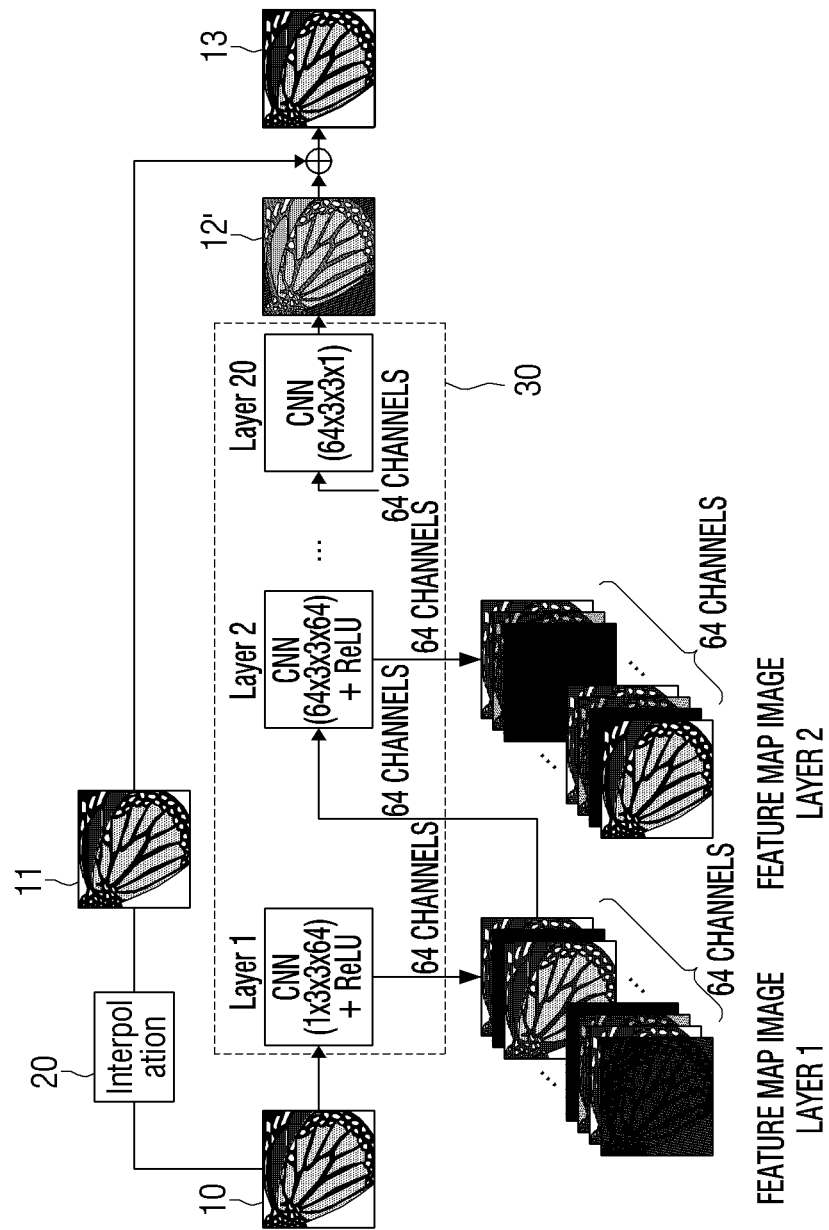
FIG. 1B is a diagram illustrating an example image processing operation of an electronic apparatus according to another embodiment of the disclosure.

FIG. 1B is a diagram illustrating an example of the artificial intelligence model for super resolution processing according to another embodiment of the disclosure.

Referring to FIG. 1B, the electronic apparatus may input an input image 10, for example, a low-resolution image, to an artificial intelligence model 30 to obtain a residual image 12' and perform interpolation processing 20 on the input image to obtain an interpolated image 11. The electronic apparatus may combine the interpolated image 11 with the residual image 12' to obtain an output image 13, for example, a high-resolution image. For example, the residual image 12' may be obtained by inputting the input image 10 to the artificial intelligence model 30 according to the embodiment illustrated in FIG. 1B, unlike the embodiment illustrated in FIG. 1A.

The artificial intelligence model 30 used for the super resolution processing illustrated in FIGS. 1A and 1B may be obtained through learning. Obtaining the artificial intelligence model through learning may refer, for example to a basic artificial intelligence model learning multiple learning data using a learning algorithm to obtain a pre-defined operation rule or an artificial intelligence model set to achieve a desired characteristic (or purpose). Such a learning may be performed through a separate server and/or system according to the disclosure, but is not limited thereto and may also be performed in the electronic apparatus. Examples of the learning algorithm include, for example, and without limitation, supervised learning, unsupervised learning, semi-supervised learning, reinforcement learning, or the like, but are not limited thereto.

Examples of the artificial intelligence model 30 may include, for example, and without limitation, a CNN-based very deep super resolution (VDSR) technology (Jiwon Kim, et al., Accurate Image Super-Resolution Using Very Deep Convolutional Networks, CVPR, 2016), an enhanced deep super resolution network (EDSR, enhanced deep residual networks for single image super-resolution), a deeply-recursive convolutional network (DRCN, "Deeply-Recursive Convolutional Network for Image Super-Resolution" Proceedings of the IEEE Conference on Computer Vision and Pattern Recognition. 2016), a multi-scale deep super-resolution system (MDSR), or the like, but are not limited thereto.

Each of the plurality of neural network layers included in the artificial intelligence model 30 may have a plurality of parameters as described above, and neural network calculation may be performed using a calculation result of a previous layer and through calculation using the plurality of parameters.

However, different parameters may be used based on characteristics of the input image such as, for example, and without limitation, a format, resolution, a compression ratio, quality, a data amount, a data transmission rate of the input image, or the like, and thus a real-time update of the parameters included in the artificial intelligence model 30 may be required. However, various artifacts may appear in an output image in a process of updating the parameters, which may cause deterioration of image quality.

In this regard, various example embodiments according to which deterioration of image quality caused by a real-time update of the parameters included in the artificial intelligence model 30 may be prevented and/or reduced where the real-time update of the parameters is needed will be described below.

Figure 2:
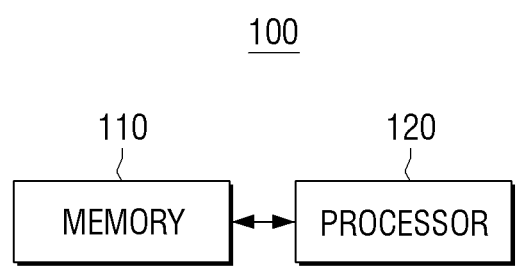
FIG. 2 is a block diagram illustrating an example configuration of an example electronic apparatus according to an embodiment of the disclosure.

FIG. 2 is a block diagram illustrating an example configuration of an electronic apparatus according to an embodiment of the disclosure.

Referring to FIG. 2, an electronic apparatus 100 includes a memory 110 and a processor (e.g., including processing circuitry) 120.

The electronic apparatus 100 may be implemented, for example, and without limitation, by a television (TV) or a set-top box. However, the electronic apparatus 100 is not limited thereto, but may be implemented by an apparatus having an image processing function and/or a display function, such as, for example, and without limitation, a smartphone, a table personal computer (PC), a notebook PC, a head mounted display (HMD), a near eye display (NED), a large format display (LFD), a display signage, a digital information display (DID), a video wall, a projector display, a camera, a camcorder, a printer, or the like.

The electronic apparatus 100 may receive various compressed images or images with various resolution. For example, the electronic apparatus 100 may receive an image compressed, for example, and without limitation, by the Moving Picture Experts Group (MPEG) (for example, MP2, MP4, and MP7), the Joint Photographic Experts Group (JPEG), Advanced Video Coding (AVC), H.264, H.265, High Efficiency Video Codec (HEVC), or the like. The electronic apparatus 100 may receive any one of, for example, and without limitation, a standard definition (SD) image, a high definition (HD) image, a Full HD image, an Ultra HD image, or the like.

The memory 110 may store required data for various embodiments of the disclosure. The memory 110 may be implemented in a form of a memory embedded in the electronic apparatus 100 or in a form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100. The memory embedded in the electronic apparatus 100 may be implemented, for example, and without limitation, by at least one of a volatile memory (for example, a dynamic random access memory (DRAM), a static RAM (SRAM), or a synchronous dynamic RAM (SDRAM)) a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM), a flash memory (for example, a NAND flash or a NOR flash), a hard drive, or a solid state drive (SSD), or the like. The memory attachable to and detachable from the electronic apparatus 100 may be implemented, for example, and without limitation, by a memory card (for example, a compact flash (CF), a secure digital (SD), a micro secure digital (Micro-SD), a mini secure digital (Mini-SD), an extreme digital (xD), a multi-media card (MMC)), an external memory (for example, a universal serial bus (USB) memory) connectable to a USB port, or the like.

According to an example, the memory 110 may store information regarding the artificial intelligence model including the plurality of layers. Storing the information regarding the artificial intelligence model may refer, for example, to storing various information related to an operation of the artificial intelligence model, such as, for example, and without limitation, information regarding the plurality of layers included in the artificial intelligence model, and information regarding parameters used in each of the plurality of layers.

According to another example, the memory 110 may store an image received, for example, and without limitation, from an external apparatus (for example, a source apparatus), an external storage medium (for example, a USB), an external server (for example, online storage), or the like. The image may be a digital moving image, but is not limited thereto.

According to another example, the memory 110 may store various image information required for image processing, such as, for example, and without limitation, texture information for texture processing and edge information for edge processing. In addition, the memory 110 may store a final output image generated by the image processing.

According to an embodiment of the disclosure, the memory 110 may be implemented by a single memory storing data generated by various operations according to the disclosure. However, according to another embodiment of the disclosure, the memory 110 may also include a plurality of memories.

The processor 120 may include various processing circuitry and controls a general operation of the electronic apparatus 100. The processor 120 may be implemented by one processor or a plurality of processors.

According to an embodiment, the processor 120 may include various processing circuitry, such as, for example, and without limitation, a digital signal processor (DSP) processing a digital image signal, a microprocessor, a graphics processing unit (GPU), an artificial intelligence (AI) processor, a neural processing unit (NPI), a time controller (TCON), a dedicated processor, or the like. However, the processor 120 is not limited thereto, but may include, for example, and without limitation, one or more of a central processing unit (CPU), a micro controller unit (MCU), a micro processing unit (MPU), a controller, an application processor (AP), a communication processor (CP), an ARM processor, or may be defined by these terms. In addition, the processor 120 may be implemented by a system-on-chip (SoC) or a large scale integration (LSI) in which a processing algorithm is embedded, or may be implemented by an application specific integrated circuit (ASIC) or a field programmable gate array (FPGA).

The processor 120 for executing the artificial intelligence model according to the embodiment of the disclosure may include, for example, and without limitation, a general processor such as a CPU, an AP, or a DSP, a graphic dedicated processor such as a GPU or a vision processing unit (VPU), an artificial intelligence dedicated processor such as a neural processing unit (NPU), or the like. The processor 120 may perform a control to process input data according to a pre-defined operation rule or an artificial intelligence model stored in the memory 110. Where the processor 120 is an artificial intelligence dedicated processor, the artificial intelligence dedicated processor may be designed to have a hardware structure specialized in processing of a specific artificial intelligence model.

The processor 120 may perform image processing on an input image to obtain an output image. The input image and the output image may, for example, and without limitation, be an SD image, an HD image, a Full HD image, an Ultra HD image, or the like. For example, the output image may be an ultra high definition (UHD) image, for example, a 4K (3840×2160) image, a 8K (7680×4320) image, or an image with higher resolution (for example, 16K or 32K), but is not limited thereto. The image processing may be digital image processing including, for example, and without limitation, at least one of image enhancement, image restoration, image transformation, image analysis, image understanding, image compression, or the like.

According to an embodiment of the disclosure, the processor 120 may process the input image using the artificial intelligence model to obtain the output image. The processor 120 may pre-process the input image and process the pre-processed image using the artificial intelligence model to obtain the output image. The pre-processing may include the interpolation processing, but is not necessarily limited thereto. The pre-processing may include various image processing capable of enhancing image quality of the input image without using the artificial intelligence model. Hereinafter, however, the interpolation processing being performed on the input image will be described for convenience of explanation.

According to an embodiment, the processor 120 may interpolate the input image and process the interpolated image using the artificial intelligence model to obtain the output image. According to another embodiment, the processor 120 may interpolate the input image and input the input image to the artificial intelligence model, in parallel, to obtain the output image. For example, the processor 120 may perform the interpolation processing using at least one of interpolation techniques such as, for example, and without limitation, bilinear interpolation, nearest neighbor interpolation, bicubic interpolation, deconvolution interpolation, subpixel convolution interpolation, polyphase interpolation, trilinear interpolation, linear interpolation, or the like.

Further, the artificial intelligence model may process and output the input image or the interpolated image through calculation using the plurality of neural network layers (hereinafter, referred to as layers). As an example, the artificial intelligence model may generate and output the residual image. Each of the plurality of layers may generate a residual image based on the interpolated image using a filter having different parameters. The parameter may be the same as or similar to that of a weighted value (or coefficient) of the filter. The artificial intelligence model may perform calculation using various types of activation functions such as, for example, and without limitation, an identity function, a logistic sigmoid function, a hyperbolic tangent (tan h) function, a rectified linear unit (ReLU) function, a leaky ReLU function, or the like. However, the artificial intelligence model does not necessarily generate only the residual image, and may process the input image using various methods depending on an implementation example of the artificial intelligence model, and may output the processed image.

According to an embodiment, the processor 120 may process the input image using one artificial intelligence model. According to another embodiment, the processor 120 may process the input image using a plurality of artificial intelligence models. The plurality of artificial intelligence models may be operated sequentially or in parallel. As an example, the processor 120 may input an input image to a first artificial intelligence model, input an image output from the first artificial intelligence model to a second artificial intelligence model, and obtain an output image based on an image output from the second artificial intelligence model. As another example, the processor 120 may input an input image to each of the first artificial intelligence model and the second artificial intelligence model, and obtain an output image based on a plurality of images output from the first and second artificial intelligence models in parallel.

For example, the plurality of artificial intelligence models may include a model generating a first residual image and a model generating a second residual image. The plurality of artificial intelligence models may include a model for upscaling of resolution and a model for noise reduction. The plurality of artificial intelligence models may include a model for processing an object region and a model for processing a background region.

The processor 120 may obtain an image output from the artificial intelligence model, for example, the residual model, the pre-processed model, and the output image based on, for example, the interpolated image. For example, the processor 120 may obtain the output image by adding up a pixel value of the interpolated image and a pixel value of the residual image in a pixel unit. The processor 120 may obtain the output image based on the first and second residual images output from the first and second artificial intelligence models, respectively, and the pre-processed image. The processor 120 may obtain the output image based on the second residual image and the pre-processed image obtained by inputting the first residual image output from the first artificial intelligence model to the second artificial intelligence model.

As described above, the processor 120 may obtain the residual image by inputting the input image or the interpolated image to at least one artificial intelligence model. Hereinafter, however, a non-limiting example description will be provided under the assumption that the residual image is obtained by inputting the interpolated image to one artificial intelligence model, for convenience of explanation. However, various embodiments of the disclosure may be applied even in the case where the residual image is obtained by inputting the input image to a plurality of artificial intelligence models.

According to an embodiment of the disclosure, the processor 120 may be operated in a first mode or a second mode where an update of parameters used in at least one of the plurality of layers included in the artificial intelligence model is required. For example, a real-time update of parameters included in the artificial intelligence model based on characteristics of the input image such as, for example, and without limitation, a format, resolution, a compression ratio, image quality, and a data amount, a data transmission rate (an amount of data transmitted per unit time, for example, bit/second (bps)) of the input image, or the like, may be required. Processing the input image depending on a mode may refer, for example, to the processor 120 processing the image according to an image processing method defined in each mode. For example, an instruction corresponding to the image processing method defined in each mode may be stored in the memory 110, and the processor 120 may perform corresponding image processing by executing the corresponding instruction in each mode.

According to an embodiment of the disclosure, the first mode may include a mode in which the output image is obtained using an image processed using the artificial intelligence model in which parameters used in at least one of the plurality of layers is updated, and the second mode may include a mode in which the output image is obtained without using the artificial intelligence model.

According to an example, the first mode may be a mode in which the output image is obtained based on the image processed using the artificial intelligence model in which parameters used in at least one of the plurality of layers are updated, and the interpolated image. The second mode may be a mode in which the output image is obtained based on the interpolated image, or the output image is obtained based on the input image and the interpolated image. In the second mode, the interpolated image may not be input to the artificial intelligence model, or although the interpolated image is input to the artificial intelligence model, the output image may be obtained using only the interpolated image without using the residual image output from the artificial intelligence model. In the second mode, the input image may not be input to the artificial intelligence model, or although the input image is input to the artificial intelligence model, the output image may be obtained using only the interpolated image without using the residual image output from the artificial intelligence model or using the interpolated image and the input image.

The processor 120 may select the first mode or the second mode based on a difference between existing parameters set in the filter and parameters to which the existing parameters are to be updated in the case where the update of the parameters of the filter used in at least one of the plurality of layers included in the artificial intelligence model is required. The difference between the parameters may be a difference in various properties that may affects an update speed, such as a difference in the number of parameters and a difference in parameter value.

Based on the first mode being selected, the processor 120 may update parameters used in at least one of the plurality of layers in real time, and compensate for parameters used in at least one of the remaining layers in real time based on the update of the parameters. Compensation parameters for compensating for the parameters used in at least one of the remaining layers may be obtained based on learning of the artificial intelligence model in which at least one intermediate layer includes an updated parameters.

The processor 120 may compensate for parameters used in each of the first layer and the last layer among the plurality of layers in real time based on a real-time update of parameters used in at least one intermediate layer.

For example, where first parameters used in a first intermediate layer are updated in real time, the processor 120 may compensate for parameters used in each of the first layer and the last layer in real time based on the real-time update of the first parameters. Where second parameters used in a second intermediate layer are updated in real time after the first parameters used in the first intermediate layer are updated, the processor 120 may compensate for parameters used in each of the first layer and the last layer in real time based on the update of the first and second parameters. A parameter update order of layers may be determined randomly or may be determined based on the number of parameters of each layer, a characteristic of each layer, and the like.

According to an example, the processor 120 may update the first parameters used in the first intermediate layer included in the artificial intelligence model and compensate for the parameters used in each of the first layer and the last layer in real time, and where the second parameters used in the second intermediate layer is updated in real time, the processor 120 may compensate for the parameters used in each of the first layer and the last layer in real time based on the updated first and second parameters, during operation in the second mode.

According to another example, the processor 120 may update the first parameters used in the first intermediate layer included in the artificial intelligence model during operation in the second mode and perform switching from the second mode to the first mode, and based on the second parameters used in the second intermediate layer being updated in real time in the first mode, the processor 120 may compensate for the parameters used in each of the first layer and the last layer in real time based on the update of the first and second parameters. For example, the processor 120 may perform an operation of updating and compensating for the parameters in a mixed mode in which the first mode and the second mode are mixed.

Figure 3A:
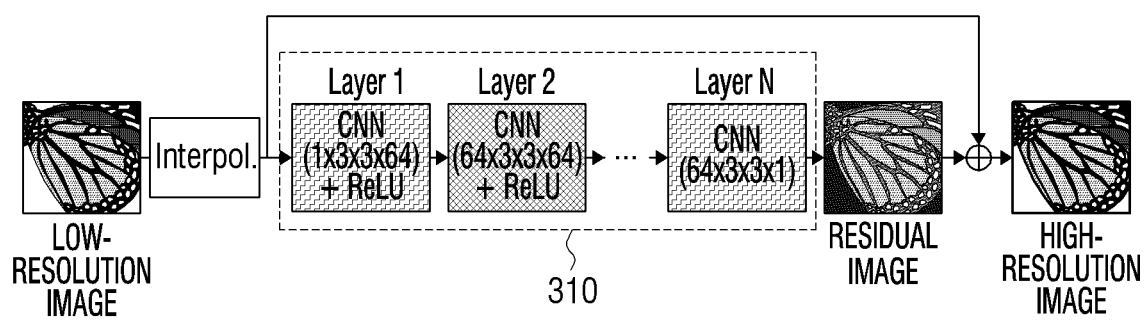
FIG. 3A is a diagram illustrating an example operation in a first mode according to an embodiment of the disclosure.
Figure 3B:
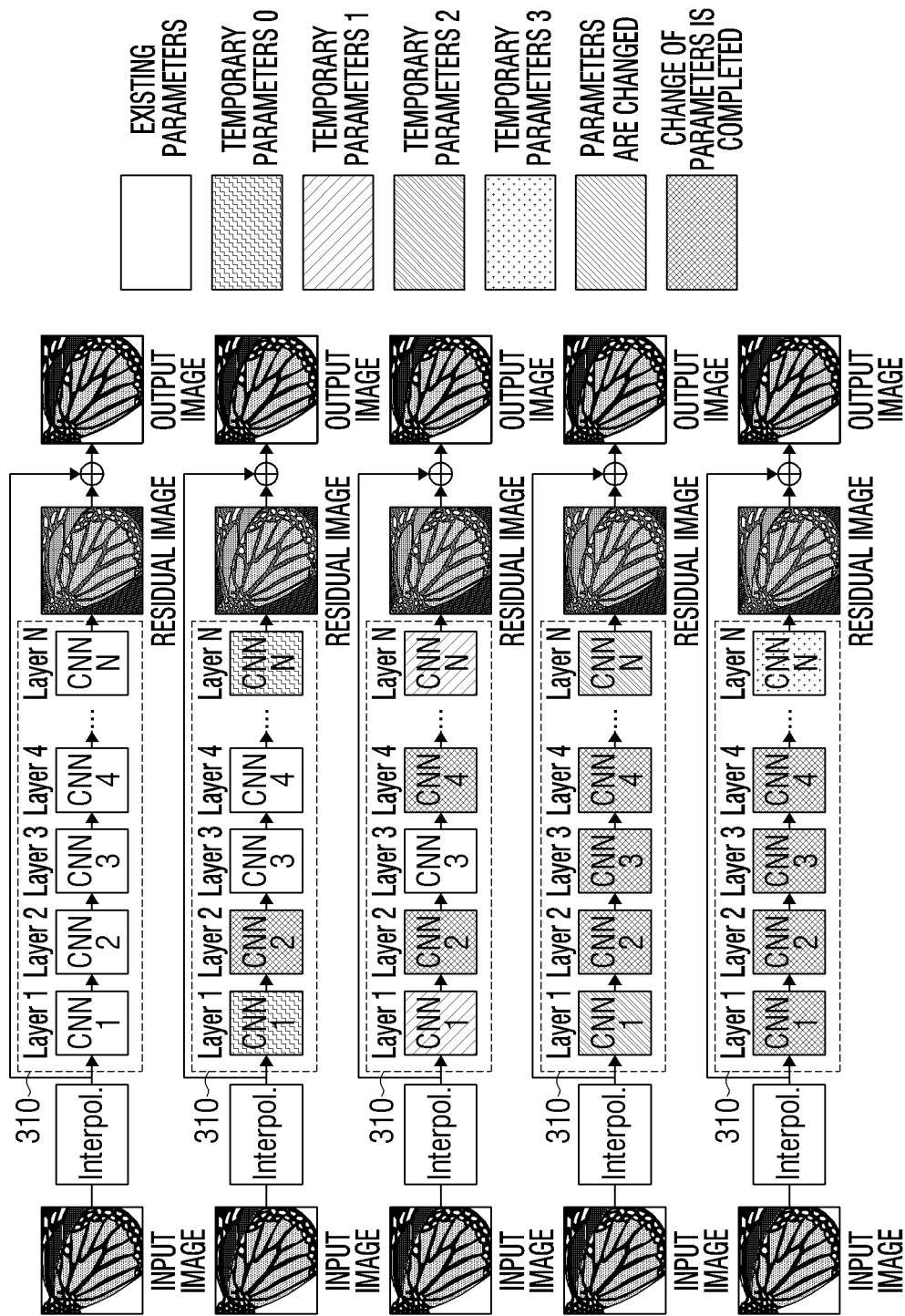
FIG. 3B is a diagram illustrating an example operation in the first mode according to an embodiment of the disclosure.
Figure 3C:
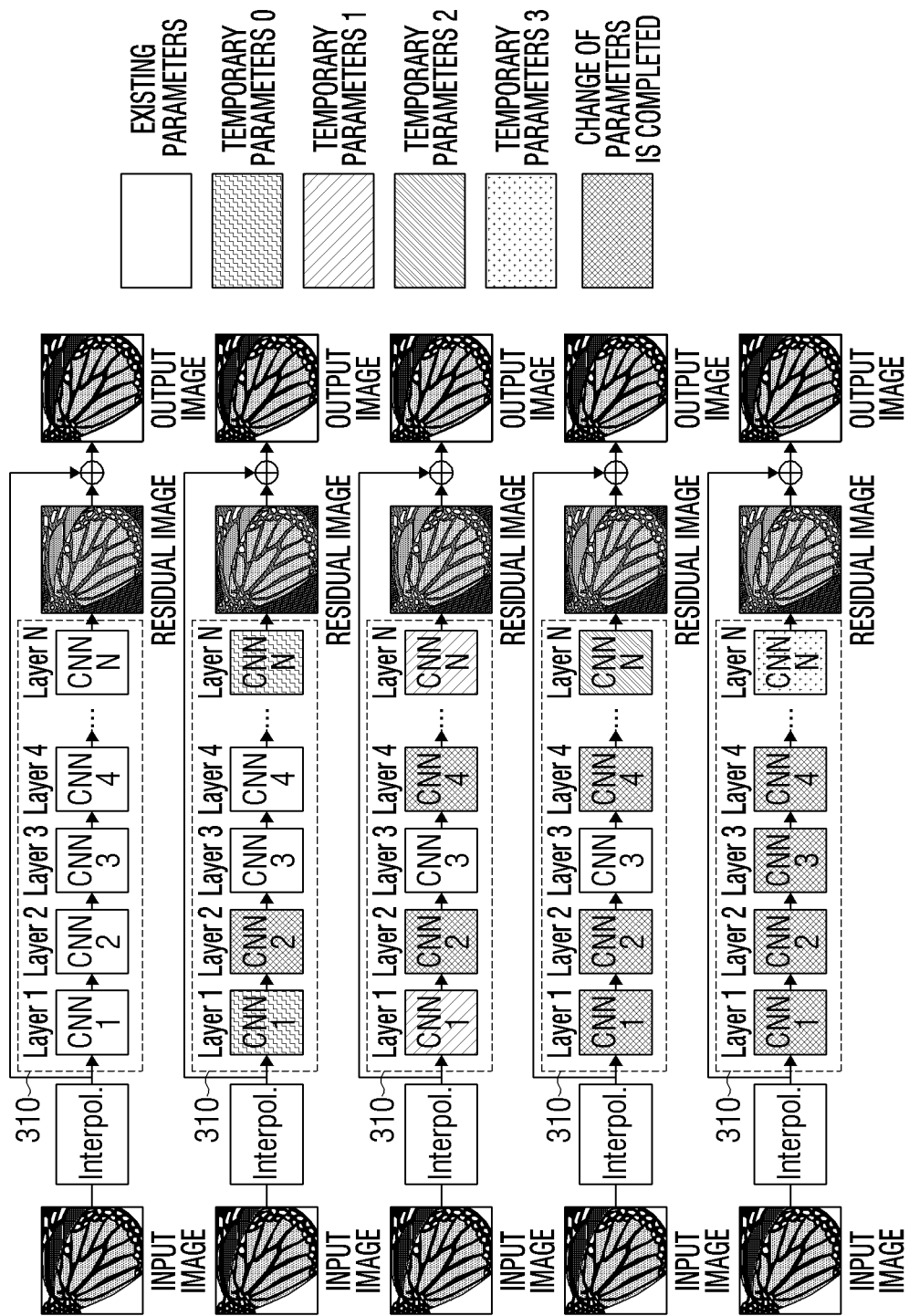
FIG. 3C is a diagram illustrating an example operation in the first mode according to an embodiment of the disclosure.

FIGS. 3A, 3B and 3C are diagrams illustrating an example operation in the first mode according to the embodiment of the disclosure.

FIG. 3A is a diagram illustrating an example basic operation in the first mode according to an embodiment of the disclosure.

Based the first mode being selected, the processor 120 may sequentially perform the update of the parameters of at least one layer that requires the update of the parameters, among the plurality of layers included in the artificial intelligence model 310. The processor 120 may compensate for parameters of an intermediate layer first, and compensate for parameters used in the first layer (layer 1) and the last layer (layer N) last. This is because the number of parameters used in the first layer (layer 1) and the last layer (layer N) is smaller than the number of parameters of each of other layers, such that it is easier to perform parameter compensation. For example, in the case of the CNN, the same number of filters (or kernels) as the number of channels of each convolution layer are used, and the number of channels in a convolution layer near an input terminal and an output terminal is relatively small, and thus the number of filters is also small. As a result, a filter coefficient, that is, the number of parameters becomes relatively small. This is because the number of parameters of each convolution layer is "the number of input channels*filter width*filter height*the number of filters (the number of output channels)".

As an example, where the number of filters used in each of the plurality of layers included in the artificial intelligence model is 64 is assumed for ease of explanation. According to an example, where an input image is an RGB image, the number of input channels of the first layer is three (according to another example, in the case where an input image is a luma image, the number of input channels of the first layer is one), a size of a filter applied in the first layer is 3*3, and the number of filters is 64, and thus the number of parameters used in the first layer is 3*3*3*64. Further, the number of output channels of the first layer is 64, and thus the number of input channels of the second layer is 64. Accordingly, the number of parameters used in the second layer is 64*3*3*64, which is increased as compared to the first layer.

According to another example, where it is assumed that the number of filters used in each of the plurality of layers included in the artificial intelligence model is 128 and an input image is a luma image, the number of input channels of the first layer is one, a size of a filter applied in the first layer is 3*3, and the number of filters is 128, and thus the number of parameters used in the first layer is 1*3*3*128. Further, the number of output channels of the first layer is 128, and thus the number of input channels of the second layer is 128. Accordingly, the number of parameters used in the second layer is 128*3*3*128, which is increased as compared to the first layer.

Further, the number of channels may return to the original number of channels at the output terminal, and thus the number of parameters corresponding to the convolution layer of each of the input terminal and the output terminal is relatively smaller than the number of parameters used in each of other convolution layers. According to an example of the VDCNN, the number of parameters of each of other convolution layers may be 64 times larger than the number of parameters of the first convolution layer or the last convolution layer. Further, in the EDSR, the number of parameters of each of other convolution layers may be 1820 times larger than the number of parameters of the first convolution layer or the last convolution layer. However, this is only an example, and the artificial intelligence model may also implemented in a form in which the number of filters of a layer near the input terminal is small, and the further away from the input terminal, the larger the number of the filters is.

In FIG. 3A, the case where an update of parameters used in the second layer (layer 2) is required is assumed.

In this example, the processor 120 may update the parameters used in the second layer (layer 2) while compensating for parameters used in at least one of the remaining layers, for example, parameters used in each of the first layer (layer 1) and the last layer (layer N) as illustrated in FIG. 3A. For example, the parameters used in the first layer (layer 1) and the last layer (layer N) may be replaced with temporary parameters for compensation. This is because parameters used in the plurality of respective layers correlate with one another and are learned to output an optimum output image and thus an artifact appears in an output image in the case where only the parameters used in the second layer (layer 2) are updated.

For example, the processor 120 may replace the parameters used in each of the first layer (layer 1) and the last layer (layer N) with compensation parameters for compensating for the updated parameters in the second layer (layer 2). Compensation parameters for compensating for update parameters in each of other layers may be obtained based on learning. The learning for obtaining the compensation parameters may be performed in at least one of the electronic apparatus 100, an external apparatus, or an external server. As an example, where the learning is performed in the external server will be assumed for convenience of explanation. The external server may update parameters used in at least one of the plurality of layers included in the artificial intelligence model and then learn parameters of the remaining layers to obtain the compensation parameters. The external server may learn the parameters of the remaining layers to allow the artificial intelligence model to output an image with no artifact even in the case where the parameters used in at least one of the plurality of layers included in the artificial intelligence model are updated to new parameters. For example, the external server may update parameters of the second layer to new parameters, fix the updated parameters, fix existing parameters of the remaining intermediate layers, and then learn parameters of the first layer and the last layer to obtain corresponding compensation parameters. Further, the external server may update parameters of the second layer and the third layer to new parameters, fix the updated parameters, fix existing parameters of the remaining intermediate layers, and learn parameters of the first layer and the last layer to obtain corresponding compensation parameters. The external server may provide, to the electronic apparatus 100, the compensation parameters obtained based on the learning as described above.

According to an embodiment, where an image is input in a frame unit to the artificial intelligence model, the processor 120 may update parameters of the second layer (layer 2) while at least one frame is input. For example, all of the parameters of the second layer (layer 2) may be updated while one frame is input. However, the update of the parameters of the second layer (layer 2) may also be spread while a plurality of frames are input as needed. For example, the processor 120 may perform a parameter update in a blank period based on at least one of a vertical synchronizing signal (V sync signal) or a horizontal synchronizing signal (H sync signal), but the disclosure is not necessarily limited thereto.

Further, the processor 120 may update the parameters of the second layer (layer 2) and compensate for parameters of each of the first layer (layer 1) and the last layer (layer N) while at least one frame is input. For example, the processor 120 may update all of the parameters of the second layer (layer 2) and compensate for all of the parameters of each of the first layer (layer 1) and the last layer (layer N) while one frame is input. However, the processor 120 may update all of the parameters of the second layer (layer 2) while one frame is input and may compensate for the parameters of each of the first layer (layer 1) and the last layer (layer N) while the next frame is input, as needed. Further, the compensation for the parameters of each of the first layer (layer 1) and the last layer (layer N) may also be performed while at least one frame, for example, a plurality of frames, are input.

FIG. 3B is a diagram illustrating an example sequential parameter update operation in the first mode according to an embodiment of the disclosure.

The first line of FIG. 3B illustrates an example in which image processing is performed according to parameters set in each of a plurality of layers included in an artificial intelligence model 310 in advance.

An event requiring an update of parameters used in at least one of the plurality of layers included in the artificial intelligence model 310 may occur. For example, parameters included in the artificial intelligence model 310 may need to be set based on a new parameter set due to a change in a data transmission rate of an input image or a format of the input image.

In this example, as illustrated in the second line of FIG. 3B, the processor 120 may update parameters of one intermediate layer, for example, the second layer, based on a new parameter set, for example, a parameter set corresponding to a changed format of the input image, and replace parameters of each of the first layer and the last layer with temporary parameters 0 to compensate for the parameter update of the second layer. Here, the temporary parameters 0 may be obtained by replacing the parameters of the second layer with new parameters and learning the parameters of the first layer and the last layer in a state in which existing of the remaining intermediate layers are fixed.

As illustrated in the third line of FIG. 3B, the processor 120 may update parameters of the next layer requiring a parameter update, for example, the fourth layer, based on a new parameter set, and replace the parameters of each of the first layer and the last layer with temporary parameters 1 to compensate for the parameter update of the fourth layer. The temporary parameters 1 may be obtained by replacing the parameters of the second layer and the fourth layer with new parameters and learning the parameters of the first layer and the last layer in a state in which existing parameters of the remaining intermediate layers are fixed. As such, the processor 120 may update parameters of the remaining intermediate layer, for example, the third layer, and replace the parameters of each of the first layer and the last layer with temporary parameters 2 to compensate for the parameter update of the third layer, as illustrated in the fourth line of FIG. 3B. The temporary parameters 2 may be obtained by replacing parameters of each of all the intermediate layers requiring a parameter update with new parameters and learning the parameters of the first layer and the last layer.

Based on the parameters of each of all the intermediate layers requiring a parameter update being updated in the above-described manner, the processor 120 may also update the parameters of the first layer and the last layer as illustrated in the last line of FIG. 3B. For example, the processor 120 may update the parameters of all the intermediate layers requiring a parameter update and the first layer (or the last layer) based on a new parameter set, and replace the parameter of the last layer (or the first layer) with temporary parameters 3 to compensate for the parameter update of all the intermediate layers requiring a parameter update and the first layer (or the last layer). The temporary parameters 3 may be obtained by replacing the parameters of all the intermediate layers requiring a parameter update and the first layer (or the last layer) with new parameters, and learning the parameter of the last layer (or the first layer).

FIG. 3C is a diagram illustrating another example of the sequential parameter update operation in the first mode according to the embodiment of the disclosure.

An example in which the parameters of the first layer and the last layer are updated last has been described with reference to FIG. 3B, but the disclosure is not necessarily limited thereto.

For example, operations corresponding to the first to third lines of FIG. 3C are the same as or similar to those corresponding to the first to third lines of FIG. 3B. However, parameters of the first layer may be updated after parameters of some of intermediate layers are updated as illustrated in the fourth line of FIG. 3C, and parameters of the last layer may be updated after parameters of the remainder of the intermediate layers are updated as illustrated in the last line of FIG. 3C.

In this example, only the parameters of the last layer may be replaced with the compensation parameters in the fourth line and the last line of FIG. 3C, because the parameters of the first layer are already updated. Once the parameters of the last layer are updated, the parameter update operation may be completed.

Figure 4:
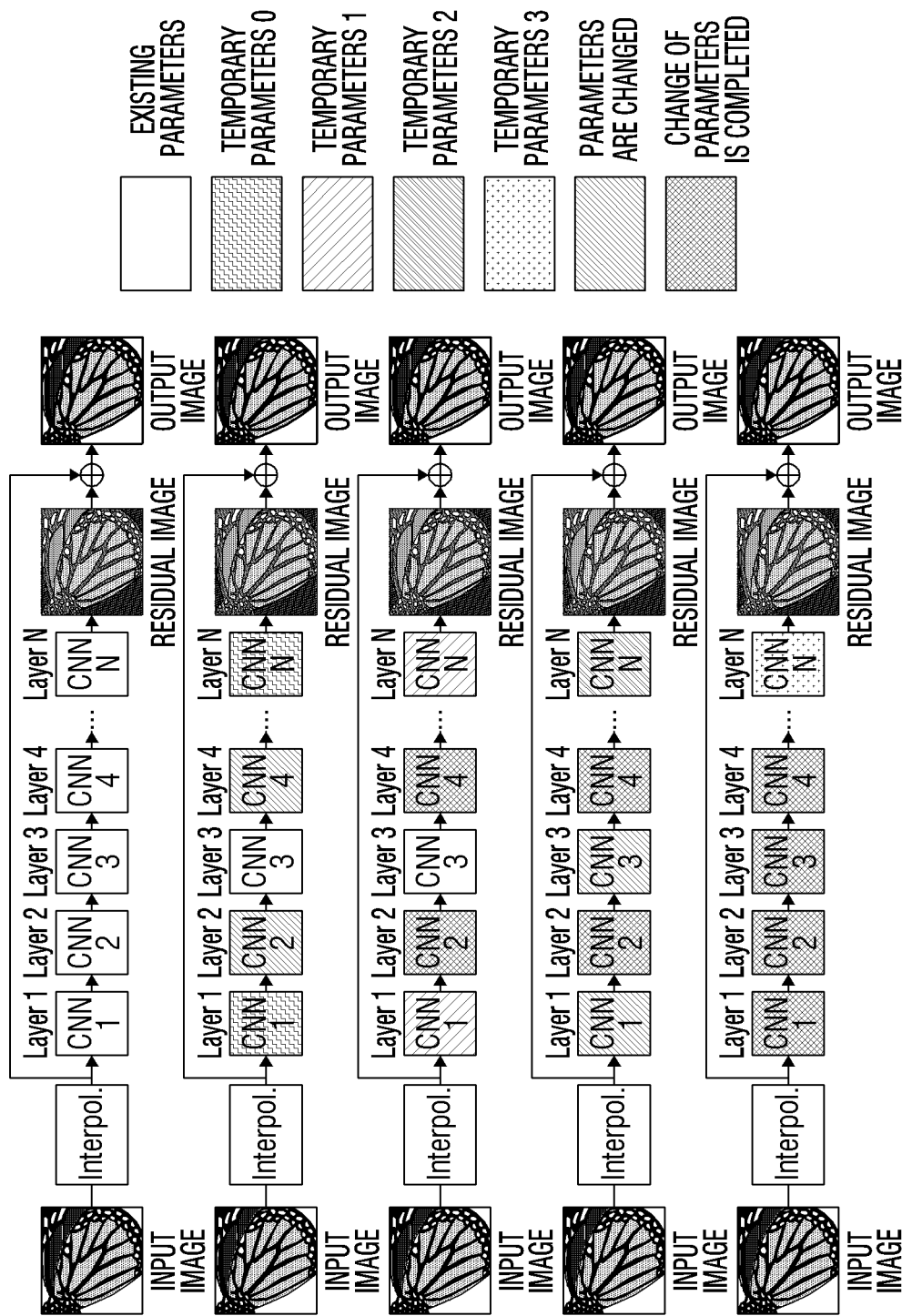
FIG. 4 is a diagram illustrating an example operation in a first mode according to another embodiment of the disclosure.

FIG. 4 is a diagram illustrating an example operation in the first mode according to another embodiment of the disclosure.

Although an example where all of parameters used in one layer are updated and then parameters of the next layer are updated has been described with reference to FIGS. 3A, 3B and 3C, parameters used in at least two layers may be updated simultaneously according to another embodiment of the disclosure.

The first line of FIG. 4 illustrates an example where image processing is performed according to existing parameters set in each of the plurality of layers included in the artificial intelligence model 310 in advance.

An event requiring an update of parameters used in the plurality of layers included in the artificial intelligence model 310 may occur. For example, parameters included in the artificial intelligence model 310 may need to be set based on a new parameter set due to a change in a data transmission rate, or a change in image resolution, a data amount, or image quality.

In this example, as illustrated in the second line of FIG. 4, the processor 120 may update some of parameters of the second layer (layer 2) and some of parameters of the fourth layer (layer 4) and replace parameters of each of the first layer (layer 1) and the last layer (layer N) with temporary parameters 0 to compensate for the parameter update of the second layer and the fourth layer, while at least one frame is input. For example, the processor 120 may update some of the parameters of the second layer (layer 2) and some of the parameters of the fourth layer (layer 4) and compensate for all of the parameters of each of the first layer (layer 1) and the last layer (layer N) while one frame is input. However, the processor 120 may update some of the parameters of the second layer (layer 2) and some of the parameters of the fourth layer (layer 4) while one frame is input and may compensate for the parameters of each of the first layer (layer 1) and the last layer (layer N) while the next frame is input, as needed. In this case, the temporary parameters 0 may be obtained by replacing some of the parameters of the second layer (layer 2) and some of the parameters of the fourth layer (layer 4) with new parameters and learning the parameters of the first layer (layer 1) and the last layer (layer N) in a state in which existing parameters of the remaining intermediate layers are fixed.

As illustrated in the third line of FIG. 4, the processor 120 may update the remainder of the parameters of the second layer (layer 2) and the remainder of the parameters of the fourth layer (layer 4) and replace the parameters of each of the first layer (layer 1) and the last layer (layer N) with temporary parameters 1 to compensate for the parameter update of the second layer and the fourth layer, while the next at least one frame is input. In this case, the temporary parameters 1 may be obtained by replacing all of the parameters of the second layer (layer 2) and the parameters of the fourth layer (layer 4) with new parameters and learning the parameters of the first layer (layer 1) and the last layer (layer N) in a state in which existing parameters of the remaining intermediate layers are fixed.

It is assumed that a parameter update is performed continuously after all of the parameters of the second layer (layer 2) and the parameters of the fourth layer (layer 4) are updated, and only a parameter update of the first layer (layer 1), the third layer (layer 3), and the last layer (layer N) is not performed.

In this example, as illustrated in the fourth line of FIG. 4, the processor 120 may update some of the parameters of another layer, for example, some of parameters of the first layer (layer 1), and some of parameters of the third layer (layer 3), and replace the parameters of the last layer (layer N) with temporary parameters 2 to compensate for the parameter update of the first layer and the third layer, while the next at least one frame is input.

As illustrated in the last line of FIG. 4, the processor 120 may update the remainder of the parameters of the first layer (layer 1) and the remainder of the parameters of the third layer (layer 3) and replace the parameters of the last layer (layer N) with temporary parameters 3 to compensate for the parameter update of the first layer and the third layer, while the next at least one frame is input.

Although an example in which the parameter update operation and the parameter compensation operation are performed over a specific frame period has been described according to the embodiments, the parameter update operation and the parameter compensation operation may be performed based on a necessary time such as a part of one frame period, an entire frame period, or a plurality of frame periods.

Figure 5A:
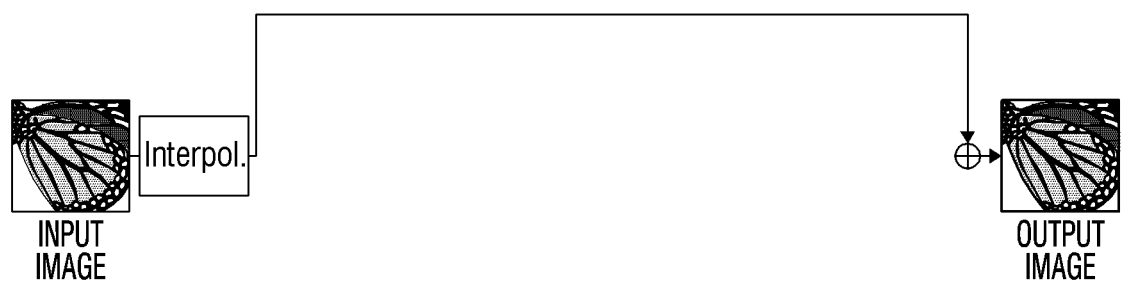
FIG. 5A is a diagram illustrating an example operation in a second mode according to an embodiment of the disclosure.
Figure 5B:
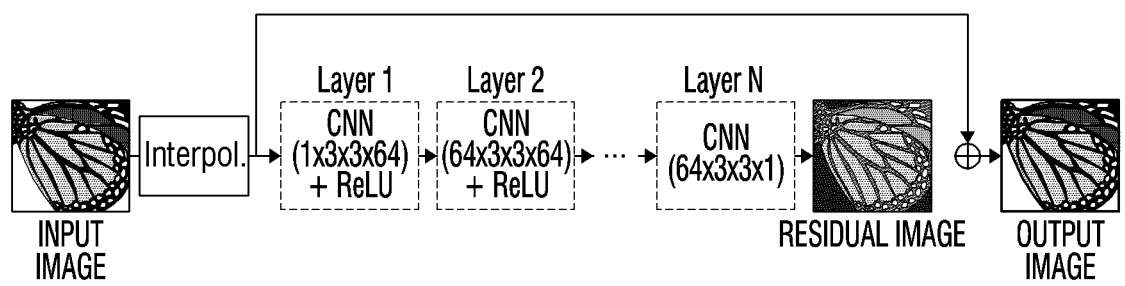
FIG. 5B is a diagram illustrating an example operation in the second mode according to another embodiment of the disclosure.
Figure 5C:
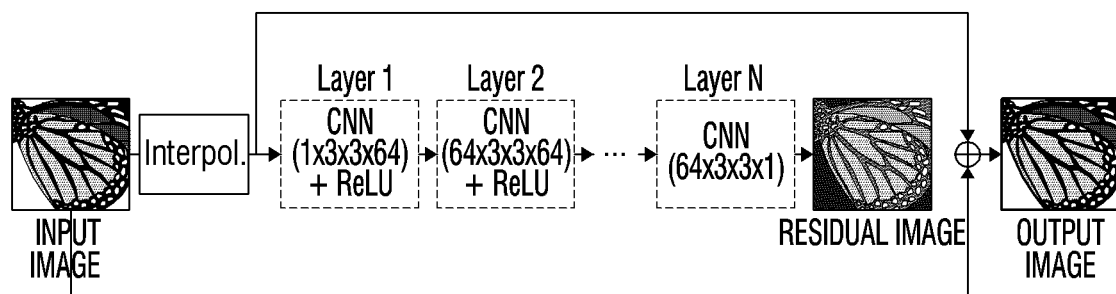
FIG. 5C is a diagram illustrating an example operation in the second mode according to still another embodiment of the disclosure.

FIGS. 5A, 5B and 5C are diagrams illustrating example operations in the second mode according to various embodiments of the disclosure.

According to an embodiment of the disclosure, as illustrated in FIG. 5A, the processor 120 may generate an output image using only an interpolated image without inputting the interpolated image to an artificial intelligence model in the second mode. The artificial intelligence model may refer, for example, to a model for generating a residual image as described above, an image processing path bypassing the artificial intelligence model is used in the second mode. Further, a kind of post-processing may also be performed on the interpolated image as needed.

According to another embodiment of the disclosure, as illustrated in FIG. 5B, the processor 120 may input an interpolated image to the artificial intelligence model and generate an output image using only the interpolated image without using a residual image output from the artificial intelligence model in the second mode. For example, the processor 120 may input the interpolated image to the artificial intelligence model as in the existing image processing method without updating parameters of the artificial intelligence model and generate the output image without using the residual image output from the artificial intelligence model in the second mode.

According to still another embodiment of the disclosure, as illustrated in FIG. 5C, the processor 120 may input the input image to the artificial intelligence model and perform interpolation processing on the input image in parallel, and generate the output image using only the interpolated image without using the residual image output from the artificial intelligence model in the second mode. However, according to still another embodiment, the output image may be generated using only the interpolated image without inputting the input image to the artificial intelligence model, or using both of the input image and the interpolated image in the second mode.

Figure 6:
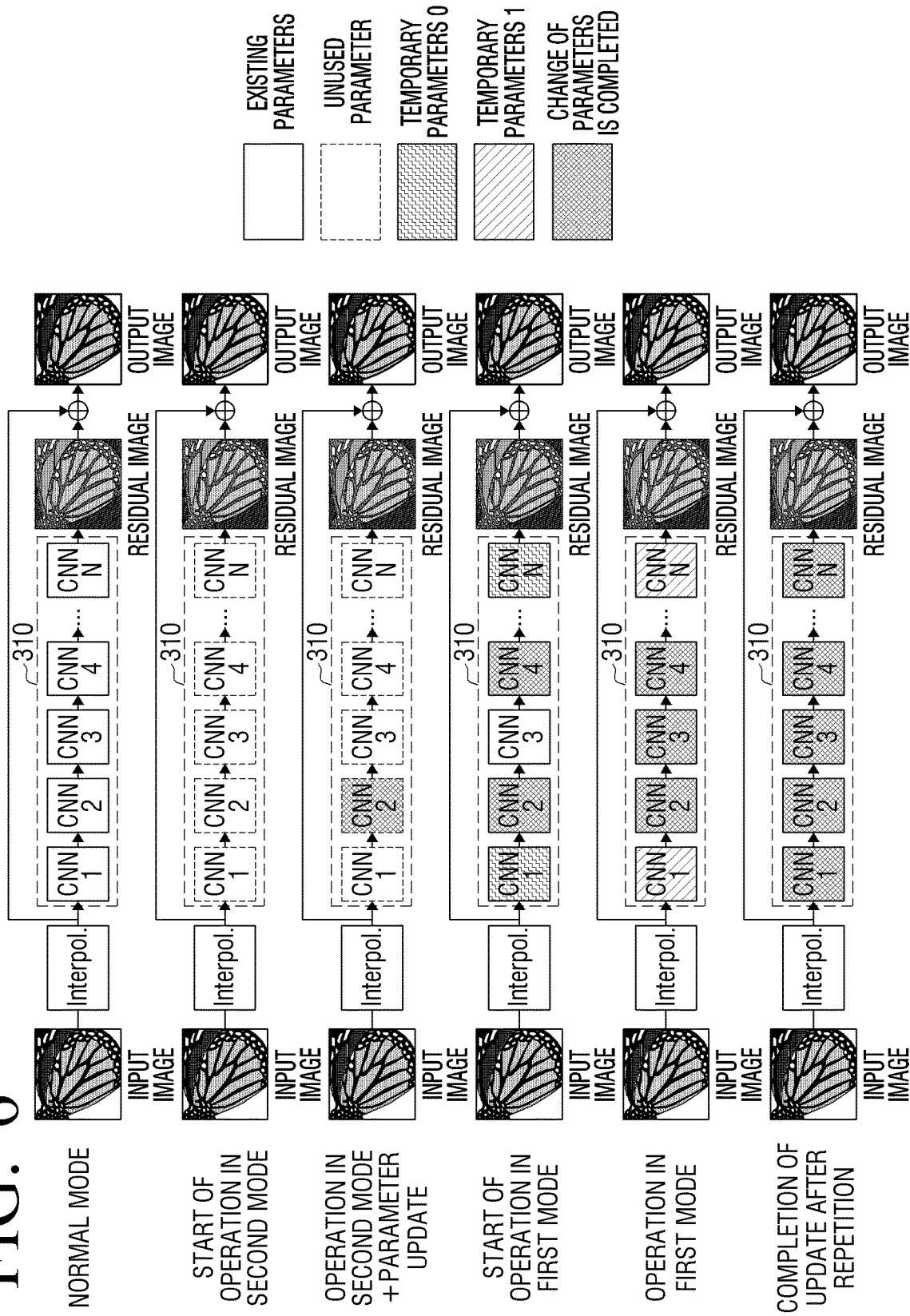
FIG. 6 is a diagram illustrating an example operation in a mixed mode in which the first mode and the second mode are mixed according to another embodiment of the disclosure.

FIG. 6 is a diagram illustrating an example operation in a mixed mode in which the first mode and the second mode are mixed according to another embodiment of the disclosure.

In the mixed mode according to an embodiment of the disclosure, the processor 120 may be operated in the second mode first where a parameter update of the artificial intelligence model is required. For example, the interpolated image may not be input to the artificial intelligence model, or the output image may be obtained using only the interpolated image without using the residual image output from the artificial intelligence model. However, the processor 120 may update the first parameters used in at least one first intermediate layer included in the artificial intelligence model during operation in the second mode, and perform switching from the second mode to the first mode. Based on the second parameters used in the second intermediate layer being updated in real time in the first mode, the processor 120 may compensate for parameters used in each of the first layer and the last layer in real time based on the first parameters updated in the second mode and the second parameters updated in the first mode.

For example, the first line of FIG. 6 illustrates an example in which image processing is performed according to parameters set in each of the plurality of layers included in the artificial intelligence model 310 in advance.

An event requiring an update of parameters used in at least one of the plurality of layers included in the artificial intelligence model 310 may occur. For example, parameters included in the artificial intelligence model 310 may need to be set based on a new parameter set due to a change in a data transmission rate of an input image, or a change in a format, resolution, a compression ratio, image quality, a data amount, or the like, of the input image.

In this example, the processor 120 is operated in the second mode as illustrated in the second line of FIG. 6, and may update parameters of at least one of intermediate layers, for example, the second layer, based on a new parameter set during operation in the second mode as illustrated in the third line of FIG. 6. For example, the processor 120 may, in parallel, but separately, update the parameters of the second layer included in the artificial intelligence model 310 and generate an output image frame using only an image frame obtained by performing interpolating processing on an input image frame.

As illustrated in the fourth line of FIG. 6, the processor 120 may perform switching from the second mode to the first mode, update parameters of at least one of other intermediate layers, for example, the fourth layer, based on a new parameter set, and replace parameters of each of the first layer and the last layer with temporary parameters 0 to compensate for the parameter update of the fourth layer. In this case, the processor 120 is operated in the first mode, and thus the processor 120 may obtain an output image using not only an interpolated image, but also a residual image output from the artificial intelligence model 310.

As illustrated in the fifth line of FIG. 6, the processor 120 may additionally update parameters of at least one another layer among the intermediate layers, for example, the third layer, based on a new parameter set, and replace the parameters of each of the first layer and the last layer with temporary parameters 1 to compensate for the parameter update of the third layer in the first mode.

Based on the parameters of each of all the intermediate layers requiring a parameter update being updated in the above-described manner, the processor 120 may also update the parameters of the first layer and the last layer as illustrated in the last line of FIG. 6.

As in the embodiments described above, although the processor 120 is basically operated in the first mode in the case where the parameter update is required, the processor 120 may also be operated in the mixed mode in which the processor 120 may be operated in the second mode at a specific timing. This is because a result of operation in the first mode may be poorer than a result of operation in the second mode at the specific timing. Therefore, the processor 120 may be operated in the mixed mode in which the first mode and the second mode are appropriately mixed, to minimize deterioration in image quality of the output image.

Where the number of artificial intelligence models 310 is one has been assumed and described according to the embodiment described above. However, the processor 120 may operate a plurality of artificial intelligence models sequentially or in parallel according to another embodiment. In this example, the processor 120 may perform an update of parameters included in each of the plurality of artificial intelligence models sequentially or in parallel according to various embodiments described above in the case where the update of the parameters included in each of the plurality of artificial intelligence models are required. For example, the processor 120 may perform an update of parameters included in a first artificial intelligence model according to various embodiments described above and then perform an update of parameters included in a second artificial intelligence model according to various embodiments described above. The processor 120 may perform the update of the parameters included in the first artificial intelligence model and the update of the parameters included in the second artificial intelligence model in parallel. In this example, the processor 120 may perform the update of the parameters included in the first artificial intelligence model and the update of the parameters included in the second artificial intelligence model in the same manner or in different manners. For example, the processor 120 may perform the update of the parameters included in the first artificial intelligence model in the manner illustrated in FIG. 3B and perform the update of the parameters included in the second artificial intelligence model in the manner illustrated in FIG. 3C.

Figure 7:
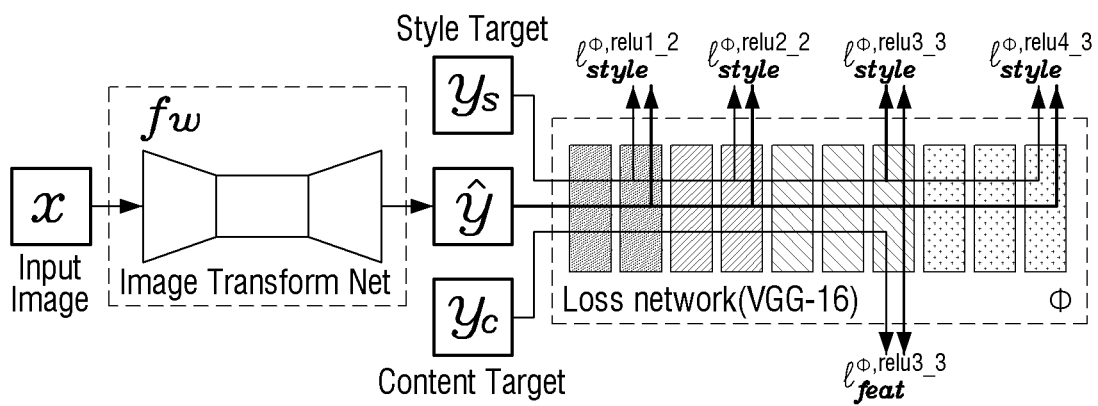
FIG. 7 is a diagram illustrating another example of the artificial intelligence model according to the embodiment of the disclosure.

FIG. 7 is a diagram illustrating another example of the artificial intelligence model according to the embodiment of the disclosure.

Although the case where the super resolution processing is performed has been described with reference to FIGS. 1 to 6 by way of example, the embodiment of the disclosure may not only be applied to the corresponding image processing, but also be applied to various types of image processing using the artificial intelligence model. For example, an embodiment of the disclosure may be applied also to style transfer processing. The style transfer may refer, for example, to processing in which in the case where there are two images (content image and style image), the main content of the content image is maintained and a style of the content image is changed to be similar to a style of the desired style image.

For example, as illustrated in FIG. 7, the style transfer processing may be performed using a CNN-based artificial intelligence model (e.g., "Perceptual Losses for Real-Time Style Transfer" (Justin Johnson, Alexandre Alahi, and Li Fei-Fei)) including a plurality of layers as illustrated in FIG. 7, and in the case where a parameter update of at least one of the plurality of layers included in the artificial intelligence model is required, for example, in the case where a style to be applied is changed, the parameter update may be performed by applying the various embodiments of the disclosure.

Figure 8:
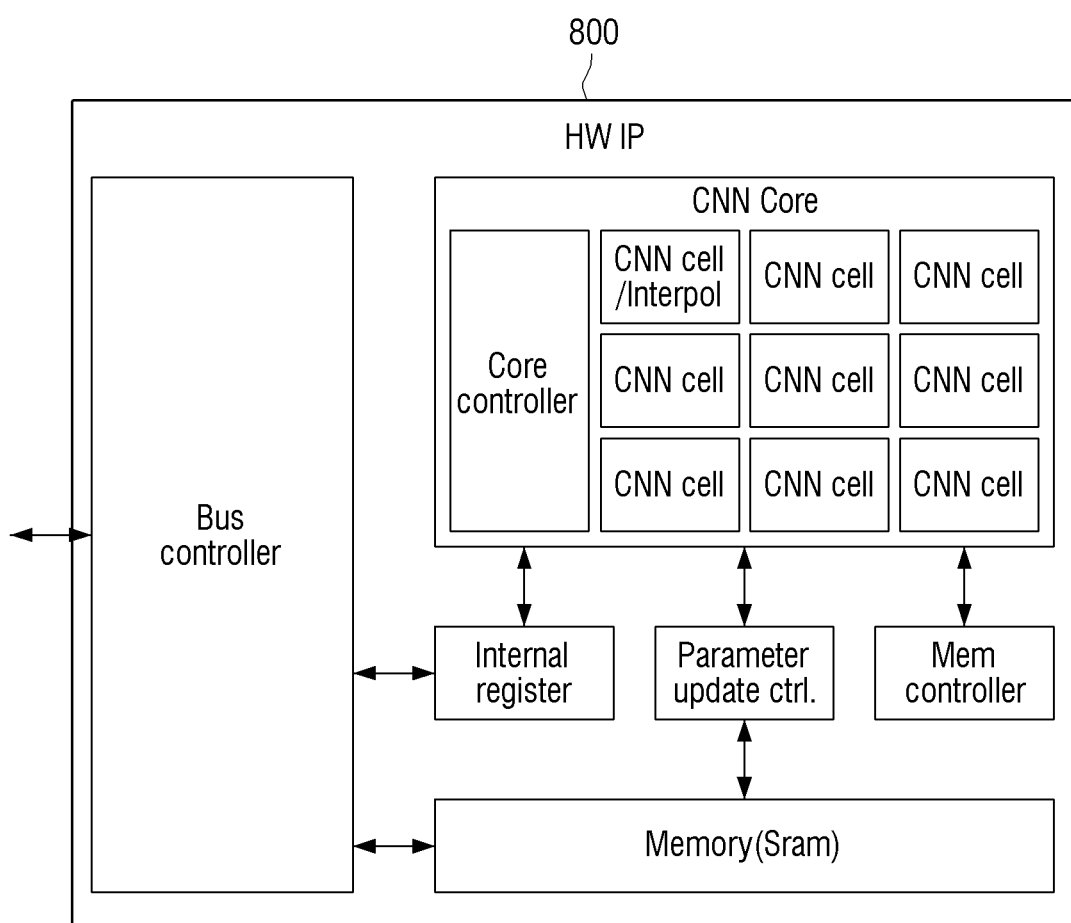
FIG. 8 is a diagram illustrating an example implementation of a processor according to an embodiment of the disclosure.

FIG. 8 is a diagram illustrating an example implementation of the processor according to an embodiment of the disclosure.

The processor 120 according to the embodiment of the disclosure may include a general processor such as, for example, and without limitation, a CPU, an AP, a DSP, a graphic dedicated processor such as a GPU or a VPU, an artificial intelligence dedicated processor such as an NPU, or the like.

However, according to another embodiment of the disclosure, the processor 120 may be designed as dedicated hardware specialized for processing of a specific artificial intelligence model. For example, in the case where the neural network is complicated and a real-time operation is important, dedicated hardware is mainly used. In this example, it may be more difficult to implement a high parameter update speed. Therefore, in the case of dedicated hardware, parameters may be stored in an internal register or only a neural network model with a fixed value may be operated. However, according to various embodiments of the disclosure, even in the case where the processor 120 is implemented by dedicated hardware, it is possible to implement a high parameter update speed.

FIG. 8 illustrates an example in which the processor 120 is designed as dedicated hardware by way of example. For example, dedicated hardware 800 illustrated in FIG. 8 may be designed as a hardware chip such as an ASIC or an FPGA. As illustrated, latency of an external memory such as a DRAM may be considered for real-time processing, and an intermediate result may be stored in an internal memory such as an SRAM and processed.

Figure 9:
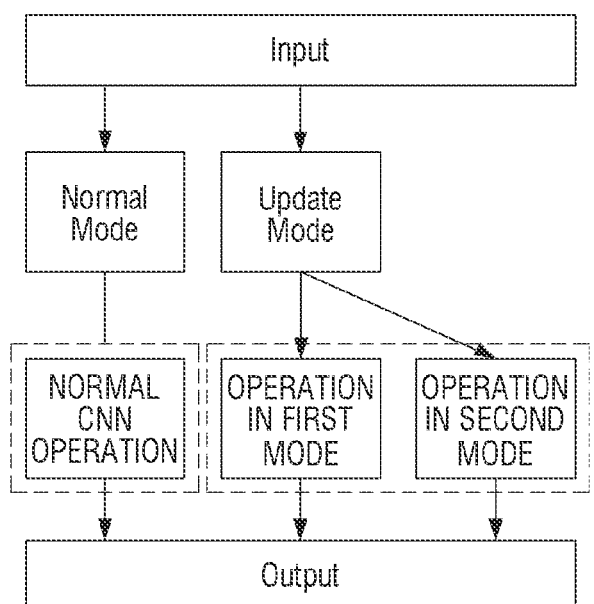
FIG. 9 is a diagram illustrating an example operation of the electronic apparatus according to an embodiment of the disclosure.

FIG. 9 is a diagram illustrating an example operation of the electronic apparatus according to an embodiment of the disclosure.

Referring to FIG. 9, the electronic apparatus 100 identifies whether an update of a parameter set used in a plurality of layers included in an artificial intelligence model is required based on information regarding an input image.

The electronic apparatus 100 may be operated in a normal mode where the update is not required, and the electronic apparatus 100 may be operated in an update mode in the case where the update is required.

The normal mode may be a mode in which the input image is processed using an artificial intelligence model including parameters set in advance. For example, the electronic apparatus 100 may perform interpolation processing on the input image and obtain an output image based on a residual image obtained by inputting the interpolated image to the artificial intelligence model including parameters set in advance, and the interpolated image in the normal mode.

The update mode may include the first mode and the second mode, and the electronic apparatus 100 may select the first mode or the second mode based on a difference between existing parameters set in the filter and parameters to which the existing parameters are to be updated. The first mode and the second mode have been described above in detail, and thus a description thereof may not be repeated here.

The electronic apparatus 100 may obtain the output image by processing the input image based on any one of the normal mode, the first mode, or the second mode. The output image may be an image with high resolution of 4K, 8K, or higher.

Figure 10:
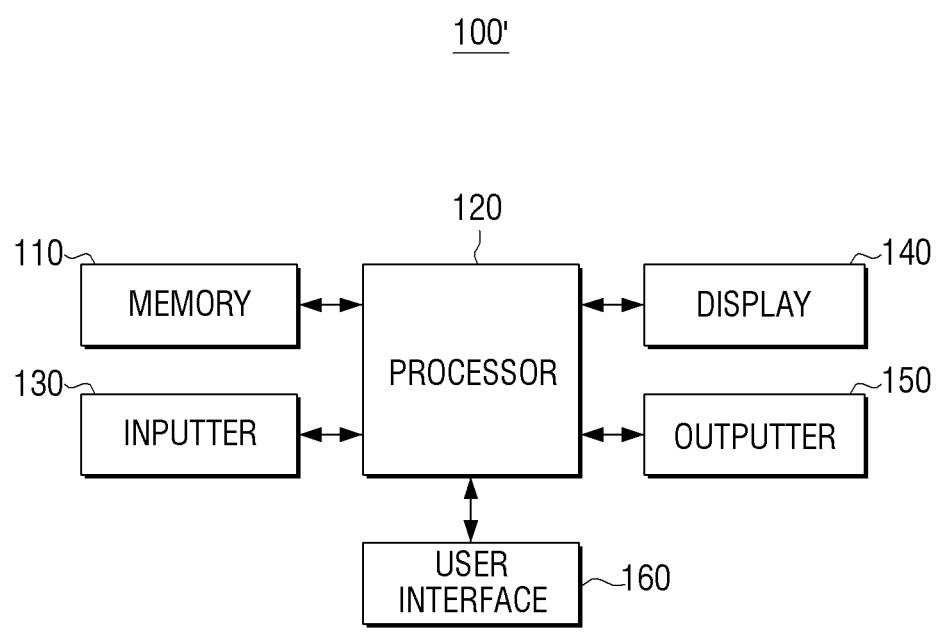
FIG. 10 is a block diagram illustrating an example implementation of an electronic apparatus according to an embodiment of the disclosure.

FIG. 10 is a diagram illustrating an example implementation of an electronic apparatus according to an embodiment of the disclosure.

Referring to FIG. 10, an electronic apparatus 100' includes a memory 110, a processor (e.g., including processing circuitry) 120, an inputter (e.g., including input circuitry) 130, a display 140, an outputter (e.g., including output circuitry) 150, and a user interface (e.g., including interface circuitry) 160. A detailed description for components overlapped with components illustrated in FIG. 2 among components illustrated in FIG. 10 may not be repeated here.

The processor 120 may include various processing circuitry and perform additional pre-processing before interpolation processing of an input image as needed. According to an example, the processor 120 may additionally perform pre-filtering for removing noise in the input image. For example, conspicuous noise may be removed by applying a smoothing filter such as a Gaussian filter, a guided filter that performs filtering by comparing the input image with pre-determined guidance, or the like.

The inputter 130 may include various input circuitry and receives various types of contents. For example, the inputter 130 may receive an image signal from an external apparatus (for example, a source apparatus), an external storage medium (for example, a USB memory), an external server (for example, online storage), or the like by a communication method such as AP-based wireless fidelity (Wi-Fi, wireless LAN network), Bluetooth, Zigbee, wired/wireless local area network (LAN), a wide area network (WAN), Ethernet, IEEE 1394, high-definition multimedia interface (HDMI), a USB, mobile high-definition link (MHL), or Audio Engineering Society/European Broadcasting Union (AES/EBU), through streaming or downloading. The image signal may be a digital image signal of any one of an SD image, an HD image, a Full HD image, or an Ultra HD image, but is not limited thereto.

Further, the inputter 130 may receive, from the external server, parameter information related to various embodiments of the disclosure, such as a parameter set corresponding to information on an input image, and compensation parameters for compensating for a real-time update of some parameters.

The display 140 may be implemented by a display including a self-emissive element, or a display including a non-self-emissive element and a backlight. For example, the display 140 may be implemented by various types of displays such as, for example, and without limitation, a liquid crystal display (LCD), an organic light emitting diode (OLED) display, a light emitting diode (LED), a micro LED, a mini LED, a plasma display panel (PDP), a quantum dot (QD) display, and a quantum dot light emitting diode (QLED). A driving circuit, a backlight unit, and the like, that may be implemented in a form such as a-si thin film transistor (TFT), a low temperature poly silicon (LTPS) TFT, and an organic TFT (OTFT) may be included in the display 140. Meanwhile, the display 140 may be implemented by a touch screen combined with a touch sensor, a flexible display, a rollable display, a three-dimensional (3D) display, a display in which a plurality of display modules are physically connected to one another, or the like. The processor 120 may control the display 140 to output an output image obtained according to various embodiments described above. Here, the output image may be an image with high resolution of 4K, 8K, or higher.

The outputter 150 may include various output circuitry and outputs an acoustic signal. For example, the outputter 150 may convert a digital acoustic signal processed in the processor 120 into an analog acoustic signal, and amplify and output the analog acoustic signal. For example, the outputter 150 may include at least one speaker unit, a D/A converter, an audio amplifier, and the like, that may output at least one channel. According to an example, the outputter 150 may output various types of multi-channel acoustic signal. In this case, the processor 120 may control the outputter 150 to perform enhancing processing on an input acoustic signal to correspond to enhancing processing of an input image, and output the processed acoustic signal. For example, the processor 120 may convert an input two-channel acoustic signal into a virtual multi-channel (for example, 5.1-channel) acoustic signal, recognize a position where the electronic apparatus 100' is placed to process the acoustic signal to be a stereophonic acoustic signal optimized for the position, or provide an optimized acoustic signal depending on a type (for example, a genre of content) of the input image.

The user interface 160 may include various interface circuitry and be implemented by a device such as a button, a touch pad, a mouse, or a keyboard, or may be implemented by a touch screen that may perform the above-described display function and an operation input function, a remote-controller transceiver, or the like. The remote-controller transceiver may receive a remote controller signal from an external remote control device or transmit a remote controller signal by at least one communication method of an infrared communication method, a Bluetooth communication method, or a Wi-Fi communication method.

The electronic apparatus 100' may additionally include a tuner or a demodulator according to an implementation example. The tuner (not illustrated) may tune a channel selected by a user or all channels stored in advance to receive a radio frequency (RF) broadcasting signal through an antenna. The demodulator (not illustrated) may receive and demodulate a digital IF (DIF) signal and perform channel decoding or the like. According to an embodiment, an input image received through the tuner may be processed through the demodulator (not illustrated) and then provided to the processor 120 for the image processing according to the embodiment of the disclosure.

Figure 11:
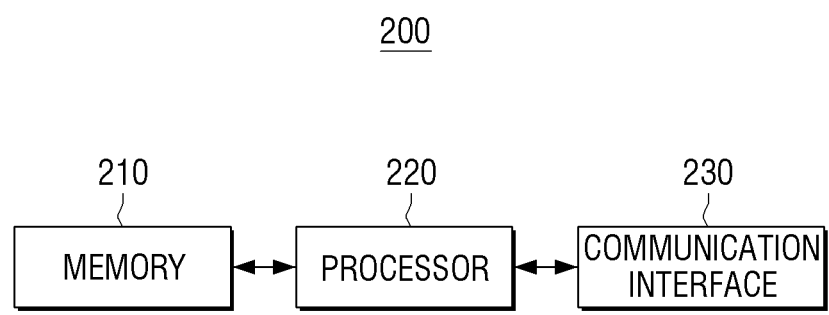
FIG. 11 is a block diagram illustrating an example configuration of a server according to an embodiment of the disclosure.

FIG. 11 is a block diagram illustrating an example configuration of a server according to an embodiment of the disclosure.

Referring to FIG. 11, a server 200 according to an embodiment of the disclosure includes a memory 210, a processor (e.g., including processing circuitry) 220, and a communication interface (e.g., including communication circuitry) 230.

An implementation example of the memory 210 is similar to that of the memory 110 of the electronic apparatus 100, and thus a detailed description thereof may not be repeated here.

The memory 210 stores information regarding the artificial intelligence model used in the electronic apparatus 100 or 100'.

According to an example, the memory 210 may store various parameter sets of the artificial intelligence model based on characteristics (for example, a format, resolution, and a compression ratio) of an input image input to the electronic apparatus 100 or 100', a data transmission rate of the input image, or the like. The various parameter sets may be obtained by learning the artificial intelligence model based on characteristics of the input image such as a format, resolution, a compression ratio, image quality, and a data amount, and a data transmission rate of the input image.

According to another example, where parameters of at least some of the plurality of layers included in the artificial intelligence model used in the electronic apparatus 100 or 100', the memory 210 may store compensation parameters for compensating for the parameter update. The compensation parameters may also be obtained through learning, which will be described in greater detail below with reference to a description of operation of the processor 220.

The communication interface 230 may include various communication circuitry and performs communication with various external apparatuses including the electronic apparatus 100 or 100'. An implementation example of the communication interface 230 is similar to that of the inputter 130 of the electronic apparatus 100', and thus a detailed description thereof may not be repeated here.

The processor 220 may include various processing circuitry and controls a general operation of the server 200. An implementation example of the processor 220 is similar to that of the processor 120 of the electronic apparatus 100 or 100', and thus a detailed description thereof may not be repeated here.

The processor 220 may obtain various parameter sets of the artificial intelligence model based on characteristics (for example, a format, resolution, and a compression ratio) of an input image input to the electronic apparatus 100 or 100', a data transmission rate of the input image, or the like, and store the obtained parameter sets in the memory 210. The processor 220 may control the communication interface 230 to transmit the parameter sets stored in the memory 210 to the electronic apparatus 100 or 100' according to various events such as a request from the electronic apparatus 100 or 100'.

Further, the processor 220 may update parameters used in at least one of the plurality of layers included in the artificial intelligence model and learn parameters of the remaining layers to obtain a compensation parameter set. The processor 220 may learn the parameters of the remaining layers to allow the artificial intelligence model to output an image with no artifact even in the case where the parameters used in at least one of the plurality of layers included in the artificial intelligence model are updated to new parameters. For example, the processor 220 may update parameters of a specific first intermediate layer to new parameters, fix the updated parameters, fix existing parameters of the remaining intermediate layers, and then learn parameters of the first layer and the last layer to obtain a first compensation parameter set corresponding thereto. Further, the processor 220 may update parameters of another second intermediate layer to new parameters in addition to the specific first intermediate layer, fix the updated parameters, fix existing parameters of the remaining intermediate layers, and learn the parameters of the first layer and the last layer to obtain a second compensation parameter set corresponding thereto. The processor 220 may store the obtained compensation parameter set in the memory 210.

As such, where parameters of at least one layer included in the artificial intelligence model are updated, the processor 220 may learn and obtain a compensation parameter set corresponding to at least one of the remaining layers for each case to compensate for the parameter update, and store the obtained compensation parameter set in the memory 210.

The processor 220 may control the communication interface 230 to transmit the compensation parameters stored in the memory 210 to the electronic apparatus 100 or 100' according to various events such as a request from the electronic apparatus 100 or 100'.

Figure 12:
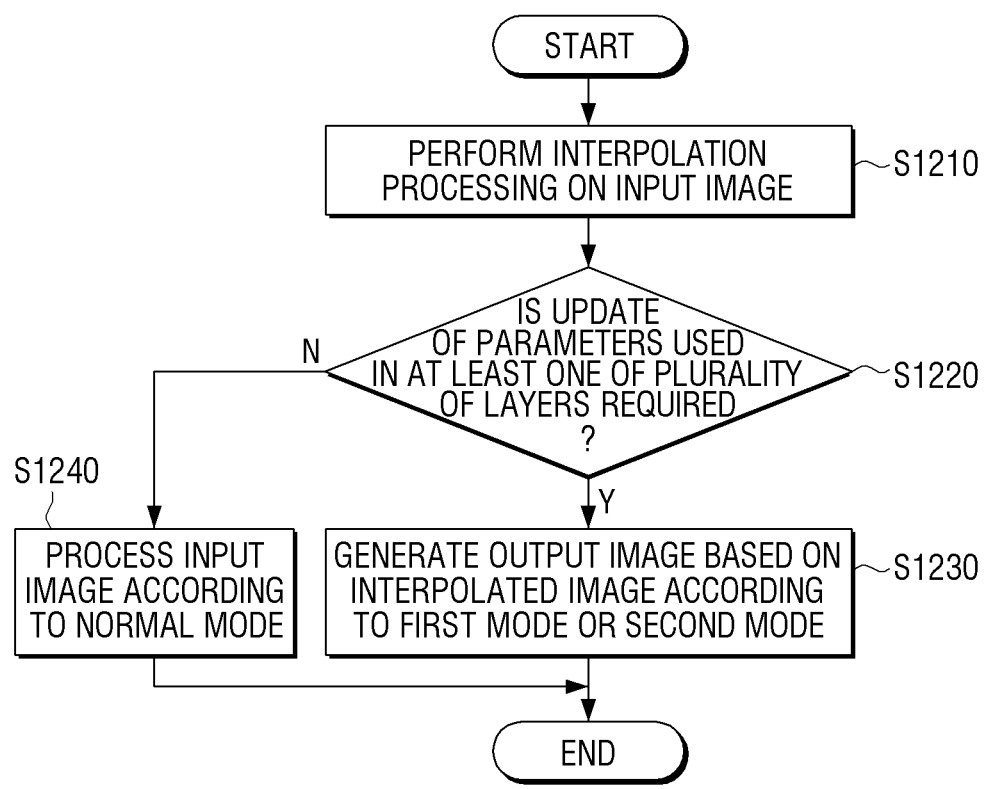
FIG. 12 is a flowchart illustrating an example method of an electronic apparatus according to an embodiment of the disclosure.

FIG. 12 is a flowchart illustrating an example method of controlling an electronic apparatus according to an embodiment of the disclosure.

According to the control method of an electronic apparatus storing information regarding an artificial intelligence model including a plurality of layers illustrated in FIG. 12, the electronic apparatus 100 or 100' may perform interpolation processing on an input image (S1210). Each of the plurality of layers included in the artificial intelligence model may generate a residual image based on the interpolated image using a filter having different parameters.

The electronic apparatus 100 or 100' identifies whether an update of parameters used in at least one of the plurality of layers included in the artificial intelligence model is required (S1220).

Where it is identified that the update of parameters are required (S1220: Y), the electronic apparatus 100 or 100' obtains an output mode according to an update mode, for example, a first mode or a second mode (S1230).

The first mode may be a mode in which the output image is obtained based on the image processed using the artificial intelligence model in which parameters are updated in real time, for example, the residual image and the interpolated image. Further, the second mode may be a mode in which the output image is obtained based on the interpolated image. The output image may be an image with high resolution of 4K, 8K, or higher.

Where it is identified that the update of parameters are not required (S1220: N), the electronic apparatus 100 or 100' obtains the output image according to a normal mode (S1240). The normal mode may be a mode in which the output image is obtained based on the residual image obtained by inputting the interpolated image to the artificial intelligence model including parameters set in advance, and the interpolated image.

Further, in the processing of the input image according to the first mode or the second mode (S1230), the first mode or the second mode may be selected based on a difference between current parameters of the filter and parameters to which the current parameters are to be updated in the case where the update of the parameters of the filter used in at least one of the plurality of layers is required.

Further, the control method may further include updating parameters used in at least one of the plurality of layers in real time based on the first mode being selected, and compensating for parameters used in at least one of the remaining layers in real time based on the update of the parameters.

In this example, in the compensating for the parameters in real time, parameters used in each of the first layer and the last layer among the plurality of layers may be compensated for in real time based on a real-time update of parameters used in at least one intermediate layer.

Further, in the compensating for the parameters in real time, once first parameters used in a first intermediate layer are updated in real time, parameters used in each of the first layer and the last layer may be compensated for in real time based on the update of the first parameters, and once second parameters used in a second intermediate layer are updated in real time after the first parameters of the first intermediate layer are updated, the parameters used in each of the first layer and the last layer may be compensated for in real time based on the update of the first and second parameters.

Further, in the processing of the input image according to the first mode or the second mode (S1230), the first parameters used in the first intermediate layer included in the artificial intelligence model may be updated during operation in the second mode and switching from the second mode to the first mode may be performed, and once the second parameters used in the second intermediate layer are updated in real time in the first mode, the parameters used in each of the first layer and the last layer may be compensated for in real time based on the update of the first and second parameters.

Compensation parameters for compensating for the parameters used in at least one of the remaining layers may be obtained based on learning of the artificial intelligence model in which at least one intermediate layer includes an updated parameters.

Further, in the processing of the input image according to the first mode or the second mode (S1230), whether a parameter update is required may be identified based on at least one of a data transmission rate of the input image or information regarding the input image.

According to various example embodiments described above, where an update of parameters used in a plurality of layers included in an artificial intelligence model is required, it is possible to effectively update the parameters with less hardware resources. Further, it is possible to significantly reduce artifacts that may appear in an image due to the parameter update.

In addition, according to various example embodiments of the disclosure, where the parameter update is required due to a change in input information, the operation is performed in one of the plurality of modes, and thus it is possible to identify whether the embodiment of the disclosure is applied based on image quality of a displayed image. For example, where the parameter update is required due to a change in input information, for example, if using the second mode, an output image with deteriorated image quality is displayed due to insufficient edge processing, texture processing, and the like, and if using the first mode, an output image with enhanced image quality is displayed due to sufficient edge processing, texture processing, and the like. Therefore, it is possible to identify whether the embodiment of the disclosure is applied.

Various embodiments of the disclosure may be applied to all electronic apparatuses capable of performing image processing, such as, for example, and without limitation, an image receiving apparatus such as a set-top box, and an image processing apparatus, in addition to the display apparatus.

The methods according to the various embodiments of the disclosure described above may be implemented in a form of an application that may be installed in the existing electronic apparatus, or in a form of software. Alternatively, the methods according to the various embodiments of the disclosure described above may be performed using a deep-learning based artificial neural network (or deep artificial neural network), for example, the learning network model.

Further, the methods according to the various embodiments of the disclosure described above may be implemented by performing a software upgrade or a hardware upgrade with respect to the existing electronic apparatus.

Further, the various embodiments of the disclosure described above may be executed through an embedded server provided in the electronic apparatus, or an external server of the image processing apparatus.

According to an embodiment of the disclosure, the various embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the image processing apparatus (for example, the electronic apparatus 100 or 100') according to the disclosed embodiments. Where an instruction is executed by the processor, the processor may directly perform a function corresponding to the instruction or other components may perform the function corresponding to the instruction under a control of the processor. The instruction may include a code made by a compiler or a code executable by an interpreter. The machine-readable storage medium may be provided in a form of a non-transitory storage medium. The "non-transitory" storage medium is tangible and may not include a signal, and does not distinguish whether data are semi-permanently or temporarily stored on the storage medium.

In addition, according to an embodiment of the disclosure, the methods according to the various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In the case of the online distribution, at least portions of the computer program product may be at least temporarily stored in a storage medium such as a memory of a server of a manufacturer, a server of an application store, or a relay server or be temporarily created.

In addition, each of components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although various example embodiments of the disclosure have been illustrated and described hereinabove, the disclosure is not limited to the abovementioned embodiments, but may be variously modified by those skilled in the art to which the disclosure pertains without departing from the spirit and scope of the disclosure as disclosed in the accompanying claims.

What is claimed is:

1. An electronic apparatus comprising:
a memory configured to store information regarding an artificial intelligence model including a plurality of layers; and
a processor configured to obtain an interpolated image based on an input image and obtain an output image based on the interpolated image,
wherein the processor is configured to be selectively operated in a first mode or a second mode based on an update of parameters used in at least one of the plurality of layers being required,
the first mode includes a mode in which the output image is obtained based on the interpolated image and an image processed using the artificial intelligence model in which the parameters are updated, and
the second mode includes a mode in which the output image is obtained based on the interpolated image without using the artificial intelligence model.

2. The electronic apparatus as claimed in claim 1, wherein the processor is configured to select the first mode or the second mode based on a difference between current parameters of a filter used in at least one of the plurality of layers and parameters to which the current parameters are to be updated based on an update of the parameters of the filter being required.

3. The electronic apparatus as claimed in claim 1, wherein each of the plurality of layers included in the artificial intelligence model is configured to generate a residual image based on the interpolated image using a filter having different parameters, and
the processor is configured to obtain the output image based on the residual image output from the artificial intelligence model and the interpolated image.

4. The electronic apparatus as claimed in claim 1, wherein the processor is configured to update the parameters used in at least one of the plurality of layers in real time based on the first mode being selected, and to compensate for parameters used in at least one of the remaining layers in real time based on the update of the parameters based on the first mode being selected.

5. The electronic apparatus as claimed in claim 4, wherein the processor is configured to compensate for parameters used in each of a first layer and a last layer among the plurality of layers in real time based on the real-time update of parameters used in the at least one layer.

6. The electronic apparatus as claimed in claim 5, wherein the processor is configured to compensate for the parameters used in each of the first layer and the last layer in real time based on an update of first parameters used in a first intermediate layer based on the first parameters being updated in real time, and to compensate for the parameters used in each of the first layer and the last layer in real time based on the update of the first parameters and an update of second parameters used in a second intermediate layer based on the second parameters being updated in real time after the first parameters of the first intermediate layer are updated.

7. The electronic apparatus as claimed in claim 5, wherein the processor is configured to update first parameters used in a first intermediate layer included in the artificial intelligence model during operation in the second mode and to perform switching from the second mode to the first mode, and
the processor is configured to compensate for the parameters used in each of the first layer and the last layer in real time based on the update of the first parameters and an update of second parameters used in a second intermediate layer based on the second parameters being updated in real time in the first mode.

8. The electronic apparatus as claimed in claim 4, wherein compensation parameters for compensating for the parameters used in at least one of the remaining layers are obtained based on learning of the artificial intelligence model in which the at least one layer includes the updated parameters.

9. The electronic apparatus as claimed in claim 1, wherein the processor is configured to identify whether the update of the parameters is required based on at least one of a data transmission rate of the input image or information regarding the input image.

10. The electronic apparatus as claimed in claim 1, further comprising a display,
wherein the processor is configured to control the display to output the output image, and
the output image includes an image with high resolution of 4K, 8K, or higher.

11. A method of controlling an electronic apparatus in which information regarding an artificial intelligence model including a plurality of layers is stored, the method comprising:
obtaining an interpolated image based on an input image;
obtaining an output image based on the interpolated image; and
wherein the obtaining the output image comprises;
obtaining the output image based on selectively operating a processor in a first mode or a second mode based on an update of parameters used in at least one of the plurality of layers being required,
wherein the first mode includes a mode in which the output image is obtained based on the interpolated image and an image processed using the artificial intelligence model in which the parameters are updated, and
the second mode includes a mode in which the output image is obtained based on the interpolated image without using the artificial intelligence model.

12. The method as claimed in claim 11, wherein in the obtaining the output image comprises, based on an update of parameters of a filter used in at least one of the plurality of layers being required, selecting the first mode or the second mode based on a difference between current parameters of the filter and parameters to which the current parameters are to be updated.

13. The method as claimed in claim 11, wherein each of the plurality of layers included in the artificial intelligence model generates a residual image based on the interpolated image using a filter having different parameters, and the electronic apparatus obtains the output image based on the residual image output from the artificial intelligence model and the interpolated image.

14. The method as claimed in claim 11, further comprising updating the parameters used in at least one of the plurality of layers in real time based on the first mode being selected, and compensating for parameters used in at least one of the remaining layers in real time based on the update of the parameters based on the first mode being selected.

15. The method as claimed in claim 14, wherein in the compensating for the parameters in real time, parameters used in each of a first layer and the last layer among the plurality of layers are compensated for in real time based on the real-time update of parameters used in the at least one layer.

16. The method as claimed in claim 15, wherein in the compensating for the parameters in real time, the parameters used in each of the first layer and the last layer are compensated for in real time based on an update of first parameters used in a first intermediate layer based on the first parameters being updated in real time, and the parameters used in each of the first layer and the last layer are compensated for in real time based on the update of the first parameters and an update of second parameters used in a second intermediate layer based on the second parameters being updated in real time after the first parameters of the first intermediate layer are updated.

17. The method as claimed in claim 15, further comprising:

updating first parameters used in a first intermediate layer included in the artificial intelligence model during operation in the second mode and performing switching from the second mode to the first mode; and compensating for the parameters used in each of the first layer and the last layer in real time based on the update of the first parameters and an update of second parameters used in a second intermediate layer based on the second parameters being updated in real time in the first mode.

18. The method as claimed in claim 14, wherein compensation parameters for compensating for the parameters used in at least one of the remaining layers are obtained based on learning of the artificial intelligence model in which the at least one layer includes the updated parameters.

19. The method as claimed in claim 11, wherein further comprising:

identifying whether the update of the parameters is required is identified based on at least one of a data transmission rate of the input image or information regarding the input image.

20. A non-transitory computer-readable medium storing a computer instruction which, when executed by a processor of an electronic apparatus in which information regarding an artificial intelligence model including a plurality of layers are stored, cause the electronic apparatus to perform an operation, the operation including:

obtaining an interpolated image based on an input image;

obtaining an output image based on the interpolated image; and wherein the obtaining the output image comprises;

obtaining the output image based on selectively operating the processor in a first mode or a second mode based on an update of parameters used in at least one of the plurality of layers being required, wherein the first mode includes a mode in which the output image is obtained based on the interpolated image and an image processed using the artificial intelligence model in which the parameters are updated, and the second mode includes a mode in which the output image is obtained based on the interpolated image without using the artificial intelligence model.

* * * * *